US012691592B2

(12) United States Patent
Kim et al.

(10) Patent No.: US 12,691,592 B2
(45) Date of Patent: *Jul. 28, 2026

(54) TORSIONAL SERIES ELASTIC ACTUATOR

(71) Applicant: Roboligent, Inc., Austin, TX (US)

(72) Inventors: Bongsu Kim, Austin, TX (US); James Douglas DeBacker, Jr., Austin, TX (US)

(73) Assignee: Roboligent, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,832

(22) Filed: Sep. 23, 2024

(65) Prior Publication Data

US 2025/0010490 A1 Jan. 9, 2025

Related U.S. Application Data

(63) Continuation of application No. 18/180,945, filed on Mar. 9, 2023, now Pat. No. 12,097,610, which is a (Continued)

(51) Int. Cl.
B25J 13/08 (2006.01)
B25J 9/12 (2006.01)
(Continued)

(52) U.S. Cl.
CPC ............. B25J 13/085 (2013.01); B25J 9/126 (2013.01); B25J 17/0208 (2013.01);
(Continued)

(58) Field of Classification Search
CPC ........ B25J 9/126; B25J 19/068; B25J 9/1633; B25J 17/0208; B25J 13/08
See application file for complete search history.

(56) References Cited

U.S. PATENT DOCUMENTS 5,523,662 A  6/1996  Goldenberg et al.
5,525,845 A  6/1996  Beale
(Continued)

FOREIGN PATENT DOCUMENTS

CN  102699928 A  10/2012
CN  202622819  12/2012
(Continued)

OTHER PUBLICATIONS

Translated Chinese Office Action mailed Feb. 18, 2023 for Chinese patent application No. 201980022051.4, a counterpart foreign application of U.S. Appl. No. 16/361,684, 22 pages.
(Continued)

*Primary Examiner* — Jake Cook
(74) *Attorney, Agent, or Firm* — Lee & Hayes, P.C.

(57) ABSTRACT

A spring assembly for a rotary-type series elastic actuator (SEA) for use in robotic applications. The SEA including a motor, gear transmission assembly, spring assembly, and sensors. In one example, a robotic joint may include the SEA as well as two links coupled with each other at the joint assembly. The two links may be designated as input and output links. Each link may have a joint housing body which may be concentrically connected via a joint bearing so that they freely rotate against each other. The housing frame of the SEA may be fixed at the joint housing body of the input link while the output mount of the spring assembly of the SEA may be concentrically coupled with the joint housing body of the output link.

20 Claims, 23 Drawing Sheets

Related U.S. Application Data continuation of application No. 16/361,684, filed on Mar. 22, 2019, now Pat. No. 11,623,348.

(60) Provisional application No. 62/649,034, filed on Mar. 28, 2018.

(51) Int. Cl.

| | |
|---|---|
| *B25J 17/02* | (2006.01) |
| *B25J 19/00* | (2006.01) |
| *B25J 19/06* | (2006.01) |
| *F16F 1/02* | (2006.01) |
| *F16H 1/32* | (2006.01) |
| *G01L 3/14* | (2006.01) |

(52) U.S. Cl.
CPC ......... *B25J 17/025* (2013.01); *B25J 19/0091* (2013.01); *B25J 19/063* (2013.01); *F16F 1/028* (2013.01); *F16H 1/32* (2013.01); *G01L 3/1407* (2013.01); *F16F 2236/085* (2013.01)

(56) References Cited

U.S. PATENT DOCUMENTS

| | | | |
|---|---|---|---|
| 6,056,519 | A | 5/2000 | Morita |
| 7,665,373 | B2 | 2/2010 | Sakers |
| 8,176,809 | B2 | 5/2012 | Ihrke et al. |
| 8,443,694 | B2 | 5/2013 | Ihrke et al. |
| 8,598,815 | B2 | 12/2013 | Glaister et al. |
| 8,960,655 | B2 | 2/2015 | Wood |
| 9,114,798 | B1 | 8/2015 | Fox et al. |
| 9,239,100 | B1 | 1/2016 | Weber et al. |
| 9,382,942 | B2 | 7/2016 | Sakon |
| 9,810,278 | B2 | 11/2017 | Huang |
| D817,753 | S | 5/2018 | Pedley et al. |
| 9,995,357 | B2 | 6/2018 | Miyazaki |
| 10,088,068 | B2 | 10/2018 | Marocchini |
| 10,343,374 | B2 | 7/2019 | Steg |
| 10,626,944 | B2 | 4/2020 | Liao |
| 11,192,266 | B2 | 12/2021 | Schimmels et al. |
| 2009/0314103 | A1 | 12/2009 | Sakers et al. |
| 2010/0139067 | A1 | 6/2010 | Ihrke |
| 2010/0145510 | A1 | 6/2010 | Ihrke et al. |
| 2011/0067517 | A1 | 3/2011 | Ihrke |
| 2012/0160091 | A1 | 6/2012 | Dadd |
| 2015/0041619 | A1 | 2/2015 | Ellis |
| 2019/0299421 | A1 | 10/2019 | Kim et al. |
| 2023/0219236 | A1 | 7/2023 | Kim |

FOREIGN PATENT DOCUMENTS

| | | |
|---|---|---|
| CN | 103177992 | 6/2013 |
| CN | 106737825 A | 5/2017 |
| EP | 4275848 | 11/2023 |
| FR | 3017657 | 8/2015 |
| JP | H04-212030 | 8/1992 |
| JP | 2012-242114 | 12/2012 |
| JP | 2017-026150 | 2/2017 |
| JP | S63-039648 U | 6/2018 |
| JP | 2010-139067 | 6/2020 |

OTHER PUBLICATIONS

European Office Action mailed Feb. 1, 2022 for European Patent Application No. 19715747.2, a foreign counterpart to U.S. Appl. No. 16/361,684, 6 pages.

Extended European Search Report mailed Jan. 2, 2024 for European Application.

Indian Office Action mailed Jul. 7, 2022 for Indian Patent Application No. 202017041825, a foreign counterpart to U.S. Appl. No. 16/361,684, 6 pages.

PCT Invitation to Pay Additional Fees mailed on Jun. 21, 2019 for PCT Application No. PCT/US2019/023605, 22 pages.

Japanese Office Action mailed Aug. 1, 2023 for Japanese Patent Application No. 2021-502705, a foreign counterpart to U.S. Pat. No. 11,623,348, 7 pages.

Translated JP Office Action mailed Feb. 7, 2023 for JP patent application No. 2021-502705, a counterpart foreign application of U.S. Appl. No. 16/361,684, 12 pages.

Korean Office Action mailed Oct. 26, 2023 for Korean Application No. 10-2020-7030708, 7 pages.

Office Action for U.S. Appl. No. 18/180,945, mailed on Feb. 1, 2024.

Office Action for Chinese Application 201980022053.4 mailed Feb. 18, 2023, Kim, "Torsional Series Elastic Actuator", 10 pages.

Office Action for U.S. Appl. No. 16/361,684, mailed on Jun. 24, 2022, Kim, "Torsional Series Elastic Actuator", 7 Pages.

PCT Search Report and Written Opinion mailed on Aug. 12, 2019 for PCT Application No. PCT/US2019/023605, 21 pages.

Yoo et al, "Development of Rotary Hydro-Elastic Actuator with Robust Internal-Loop-Compensator-Based Torque Control and Cross-Parallel Connection Spring", Mechatronics, vol. 43, Pergamon Press, Oxford, Apr. 4, 2017, pp. 112-123.

Office Action for European Application No. 23190725.4, Dated Mar. 31, 2025, 5 pages.

Office Action for Japanese Application No. 2023-206954, Dated Dec. 3, 2024, 7 pages.

Office Action for Canadian Application No. 3,093,391, Dated Jul. 15, 2025, 4 pages.

TORSIONAL SERIES ELASTIC ACTUATOR

CROSS-REFERENCE TO RELATED APPLICATIONS

This application is a continuation of and claims priority to U.S. application Ser. No. 18/180,945 filed on Mar. 9, 2023 and entitled "TORSIONAL SERIES ELASTIC ACTUA-TOR," issuing as U.S. Pat. No. 12,097,610 on Sep. 24, 2024, which is a continuation of and claims priority to U.S. application Ser. No. 16/361,684 filed on Mar. 22, 2019, issued as U.S. Pat. No. 11,623,348 on Apr. 11, 2023 and entitled "TORSIONAL SERIES ELASTIC ACTUATOR," which is a non-provisional of and claims priority to U.S. Provisional Application No. 62/649,034 filed on Mar. 28, 2018 and entitled "TORSIONAL SERIES ELASTIC ACTUATOR," the entirety of which are incorporated herein by reference.

BACKGROUND

Unless otherwise indicated herein, the materials described in this section are not prior art to the claims in this application and are not admitted to be prior art by inclusion in this section.

Robots are automated machines that in many cases consist of movable body segments powered by actuators such as DC, AC motors, hydraulic and pneumatic actuators. In many applications, robots are designed and controlled to perform tasks based on position, trajectory, or velocity of their body segments. Usually, actuators are equipped with gear trans-missions to reduce their output speed and increase output force suited for given tasks. Sensors that detect position or velocity of actuators' output are usually installed to provide feedback signals to computing devices that control the motion of actuators.

In other applications, robots are required to exert precise force or rotational force to the environment or desired to perform tasks based on force for better stability, safety, or efficiency. For example, when physically contacting a rigid environment, position-controlled robots have a high chance to become unstable while force-controlled robots do not. When interacting or colliding with humans, force-controlled robots are safer because they are compliant to the physical interaction. When assisting human movement, force-con-trolled robots can provide more natural interaction because the human body is powered by muscles that are force-controlled actuators.

Position control-oriented actuators with gear reduction are usually limited from controlling output force precisely without force feedback in their control loops due to force nonlinearities in the gear reduction stage such as friction and stiction. Series elastic actuator (SEA), an actuator configu-ration equipped with compliant elements for force sensing, can achieve high performance in force control with several benefits including inherent stability, shock tolerance, and safety. An SEA consists of an actuator, gear transmission assembly, elastic element (e.g., a spring or a set of springs), and sensors. One or more sensors in an SEA are used to detect the deflection of the elastic element. The elastic element is usually a spring or a set of springs whose deflection is proportional to the force applied to itself. The elastic element or spring(s) with the sensor(s) is arranged in series with the actuator against the output of the SEA and serves as a force sensor. A feedback control loop in a control computer using the force feedback signal controls the output force of the SEA. This invention includes a rotary series elastic actuator that can control precise rotational force (torque).

BRIEF DESCRIPTION OF THE DRAWINGS

The detailed description is described with reference to the accompanying figures. In the figures, the left-most digit(s) of a reference number identifies the figure in which the refer-ence number first appears. The use of the same reference numbers in different figures indicates similar or identical components or features.

DETAILED DESCRIPTION

Described herein are implementations and embodiments of example actuator assemblies for robotic applications and includes a rotary-type series elastic actuator (SEA). The SEA includes a motor, gear transmission assembly, spring assembly, and sensors. The stationary parts of the motor and gear transmission are commonly fixed at an SEA housing frame. The rotary output of the motor is connected to the input part of the gear transmission, and the output part of the gear transmission is coupled with the input mount of the spring assembly.

The spring assembly may include two disc-shaped springs, an internal mechanism, and rotary position sensor. The disc spring may include circular inner and outer mounting segments that are concentric and a set of elastically deformable spirals that connect the inner and outer mounting segments. Two outer mounting segments of two springs may be coupled with each other via a spacer. The two inner mounting segments of one spring and the other spring may be designated as the input and output mounts of the spring assembly, respectively. The internal mechanism may be located between the two layers of springs and configured to amplify the deflection of the spring assembly between the input and output mount. The rotary position sensor may be coupled with the internal mechanism to read the amplified deflection. The sensor reading of the spring deflection may be converted into a torque value and communicated back to a control loop.

At a robotic joint, there may be two links coupled with each other via a joint assembly. The two links may be designated as input and output links. Each link may have a joint housing body which may be concentrically connected via a joint bearing so that they freely rotate against each other. The housing frame of the SEA may be fixed at the joint housing body of the input link while the output mount of the spring assembly of the SEA may be concentrically coupled with the joint housing body of the output link. The rotation of the motor rotor with respect to the motor stator causes the rotation of the output link with respect to the input link plus spring deflection if any. When an external force or torque are applied between the two links, a control action of a control loop may cause a rotation and motive force of the motor that lead to the deflection of the spring assembly to balance with the external force/torque and inertial force from body masses moving together with the links.

Figure 1:
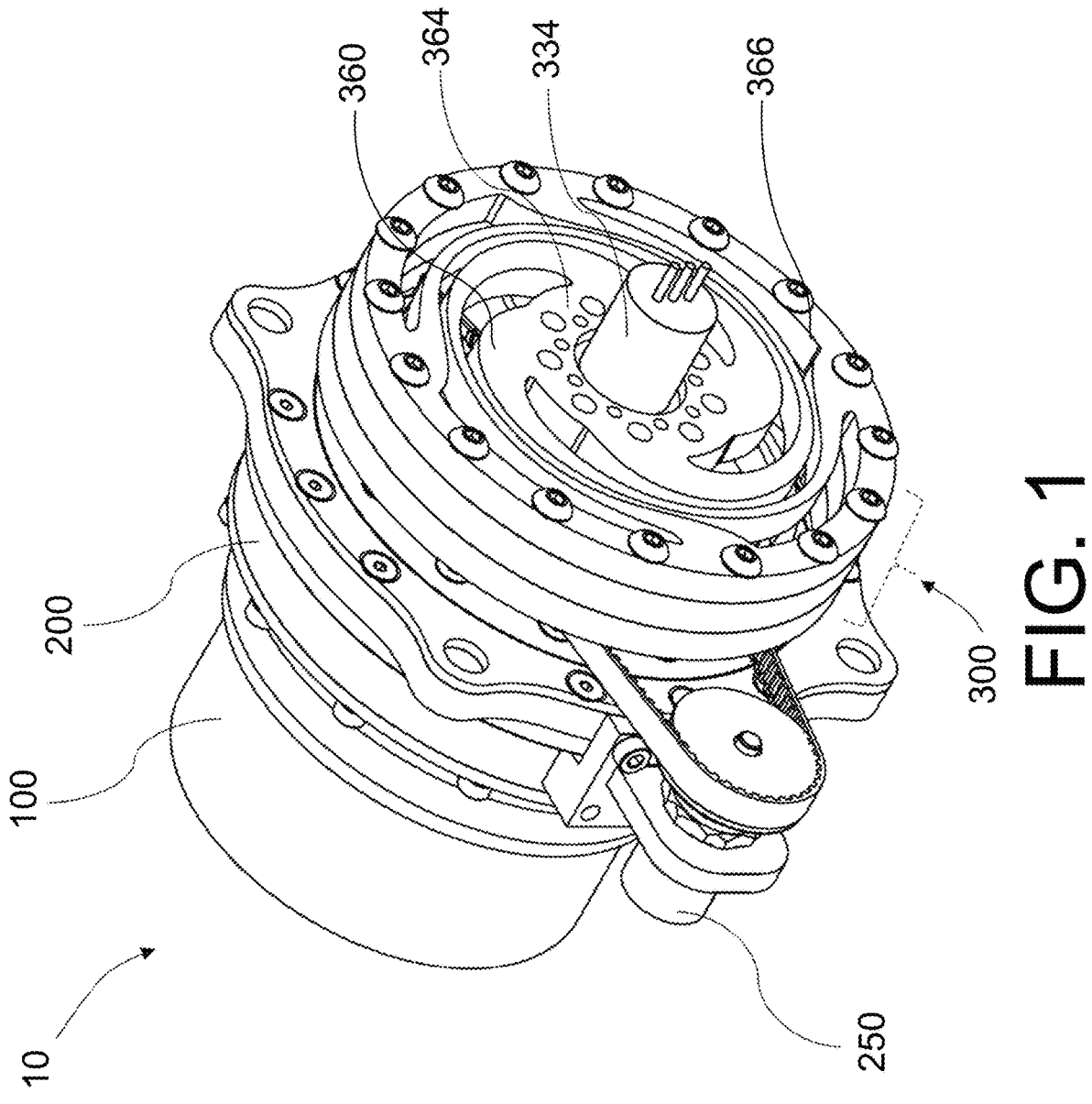
FIG. 1 illustrates an example a rotary series elastic actuator (SEA) according to some implementations.

With reference to the drawings, FIG. 1 shows an example embodiment of a rotary series elastic actuator (SEA) 10. The rotary SEA includes a motor 100, gear transmission assembly 200, spring assembly 300 with a sensor (e.g. an absolute encoder) 334, and another sensor (e.g. an absolute encoder). Additional components and detailed features of the SEA 10 are further discussed in the following paragraphs in associated with additional figures.

The motor 100 may be a rotary-type direct current (DC) motor, alternating current (AC) motor, hydraulic motor, or pneumatic motor, among other possibilities. For example, the motor type may be a brushless DC motor which may need an additional sensor (e.g. a Hall Effect sensor or a quadrature encoder) for commutation. The motor may include a stationary part (stator), rotating part (rotor), and motor output shaft that is attached to the rotor. The motor generates rotational movement and motive force at the motor shaft.

The gear transmission assembly 200 may include a set of gear transmission components and an SEA housing frame where a stationary part of the gear transmission set is fixed. The stator of the motor 100 may be commonly grounded at the SEA housing frame, too. In one example robot joint assembly, the SEA housing frame may be grounded at one robot link. The gear transmission set may have an input, output and stationary parts. For example, in some cases the gear transmission may be a Harmonic Drive that consists of a wave generator, a flex spline, and a circular spline. In a preferred configuration in this invention, the wave generator, flex spline and circular spline may be assigned as an input, output and stationary parts of the gear transmission set, respectively. The motor output shaft may be coupled to the input part of the gear transmission assembly 200 and deliver rotational motion and motive force to the gear transmission. The output part of the gear transmission assembly 200 may be coupled with a transmission output part. The number of turns of the output part of the gear transmission 200 may be reduced from the number of turns of the input part of the gear transmission 200 by the factor of gear reduction ratio while a motive force applied to the input part of the gear transmission 200 from the motor 100 may be amplified at the output part of the gear transmission 200 by the factor of the gear reduction ratio.

The sensor 250 may be an absolute encoder or potentiometer and include a rotary shaft that is connected to the transmission output part of the gear transmission 200 via a timing belt among other possibilities. The sensor 250 may measure the rotational angle of the output of the gear transmission assembly.

The spring assembly 300 may include two torsional springs 360, a spacer, and an internal mechanism with a sensor 334. Each of the two torsional springs 360 includes a circular inner mount segment 364, a circular outer mount segment 366, and a set of elastically deformable spirals 362 that connect the inner and outer segments. The two springs are coupled with each other via the spacer and the in internal mechanism resides between the two springs. There is an input mount on one spring and an output mount on the other spring of the assembly 300. The input mount of the spring assembly 300 may be coupled with the transmission output part of the gear transmission set 200 and the output mount of the spring assembly 300 may be connected to another robot link. The internal mechanism with the sensor 334 (e.g. absolute encoder) detects the rotational deflection of the spring assembly 300 between the input and output mount. The deflection of the springs may be proportional to the applied torque applied between the input and output mount of the springs assembly, and therefore the measured signal of the sensor 334 may be converted into the measured torque applied to the spring assembly. The measured torque may be fed back to a feedback control loop that may control the motor 100 to produce desired torque at the output mount of the spring assembly. When an external torque equivalent to a desired torque at the control loop is applied to the output mount of the spring assembly, the control action on the motor causing the rotational motion and force of the gear transmission output may deflect the spring assembly to generate the desired torque balanced with the external torque. On the other hand, rotational position or velocity of the output mount of the spring assembly may also be controlled by a feedback control loop that controls the rotational motion of the motor 100 using a position feedback signal from a commutation sensor at the motor 100 or the sensor 250. The angular position of the output mount of the spring assembly may be the sum of the angular position of the output part of the gear transmission and the deflection angle of the spring assembly 300. The angular position of the output part of the gear transmission may be directly measured by the sensor 250 or converted from the multi-turn motor angle.

Figure 2:
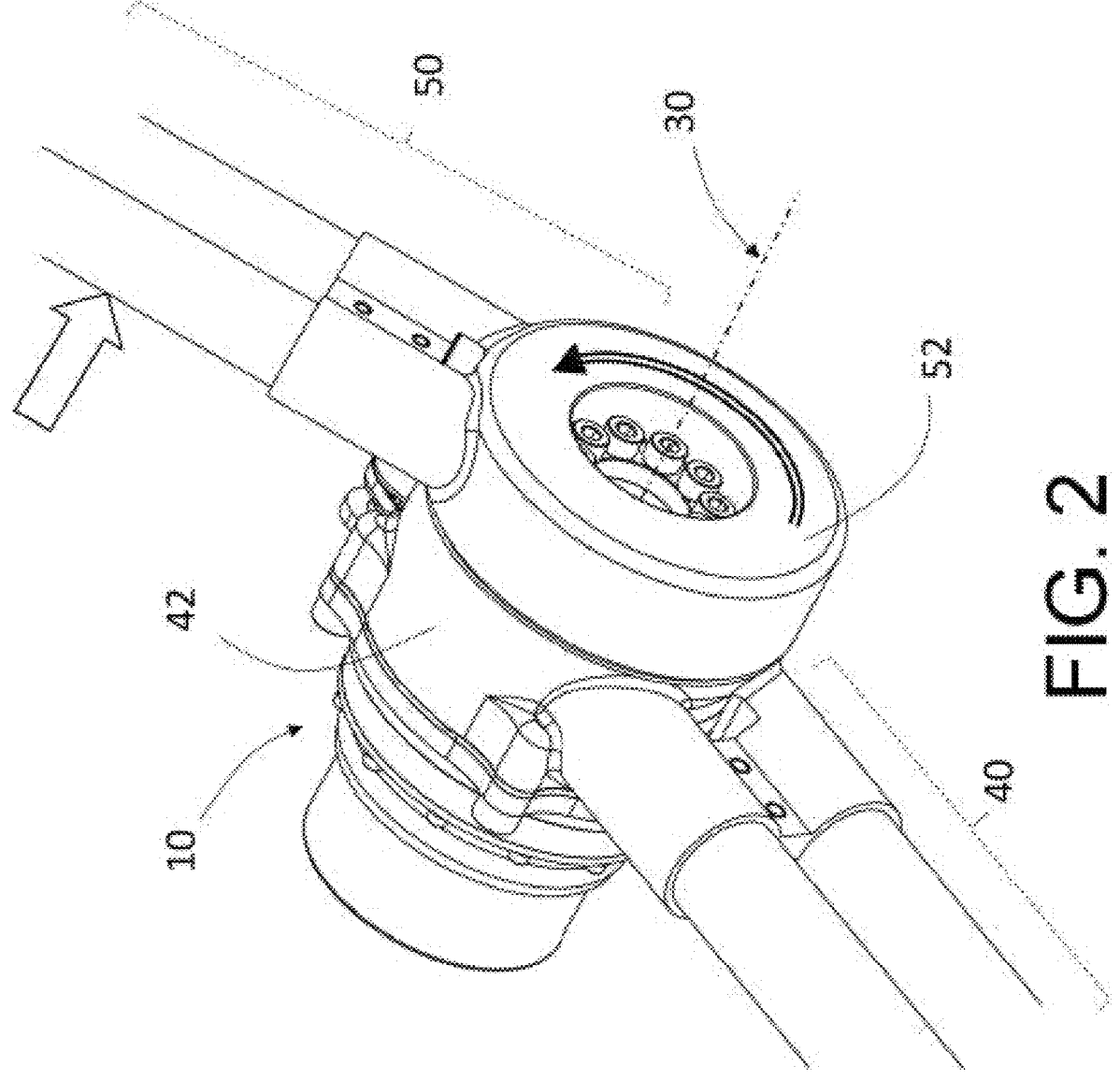
FIG. 2 illustrates an example robotic joint assembly with the SEA according to some implementations.

FIG. 2 shows an example of a robotic joint assembly that may include an SEA 10, input link 40, and output link 50. The SEA housing frame of the SEA 10 may be attached to the joint housing body 42 of the link 40 while the output mount of the spring assembly 300 of the SEA 10 is coupled with the joint housing body 52 of the output link 50 via a joint. At the joint, an outer race of a joint bearing (e.g. cross roller bearing) may be fixed at the joint housing body 42 of the input link. One side of a bore shaft that sits on the inner race of the joint bearing may be coupled with the joint housing body 52 of the output link 50 while the other side of the bore shaft may be coupled with the output mount of the spring assembly 300 of the SEA 10. The SEA 10 generates motive torque that transfers to the output link 50. The output link may be relatively rotate with respect to the link 40 around the axis 30 and may exert force to the environment.

Figure 3:
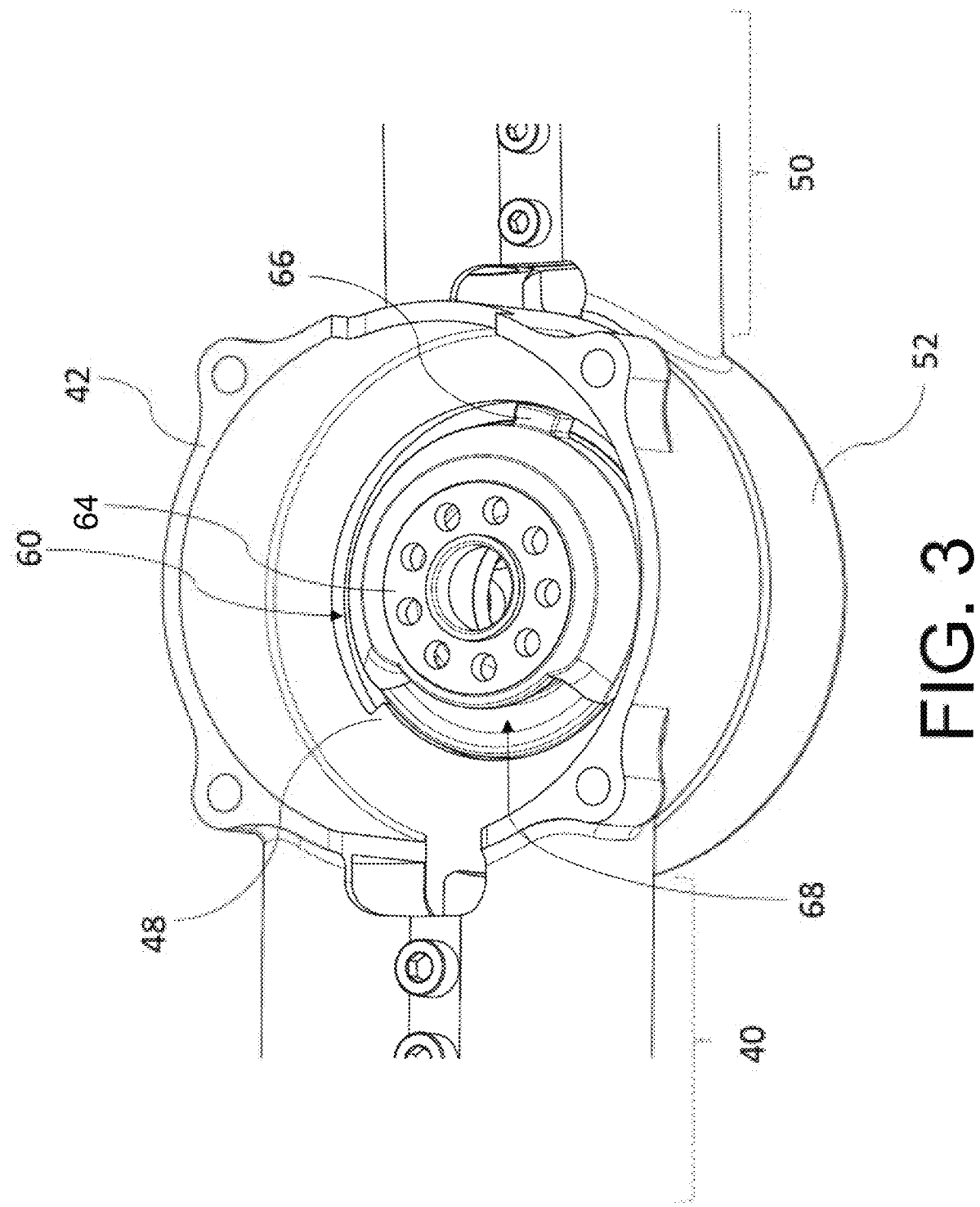
FIG. 3 illustrates an example robotic joint assembly without the SEA according to some implementations.

FIG. 3 shows an example of the robotic joint assembly without the SEA 10. The bore shaft 60 is attached to the inner race of a joint bearing whose outer race is attached to the joint housing body 42. The upper mount section 64 of the bore shaft 60 may be coupled with the output mount of the spring assembly 300 of the SEA 10. The other side of the bore shaft 60 is coupled with the joint housing body 52 of link 50. The bore shaft may have a through hole 68 for electric power cables or sensor lines to go through across the joint. An extruded portion 66 at the bore shaft 60 may serve as a hard stop with an extruded portion 48 at the joint housing body of link 40 to limit the rotating angle of the link 50 with respect to the link 40.

Figure 4:
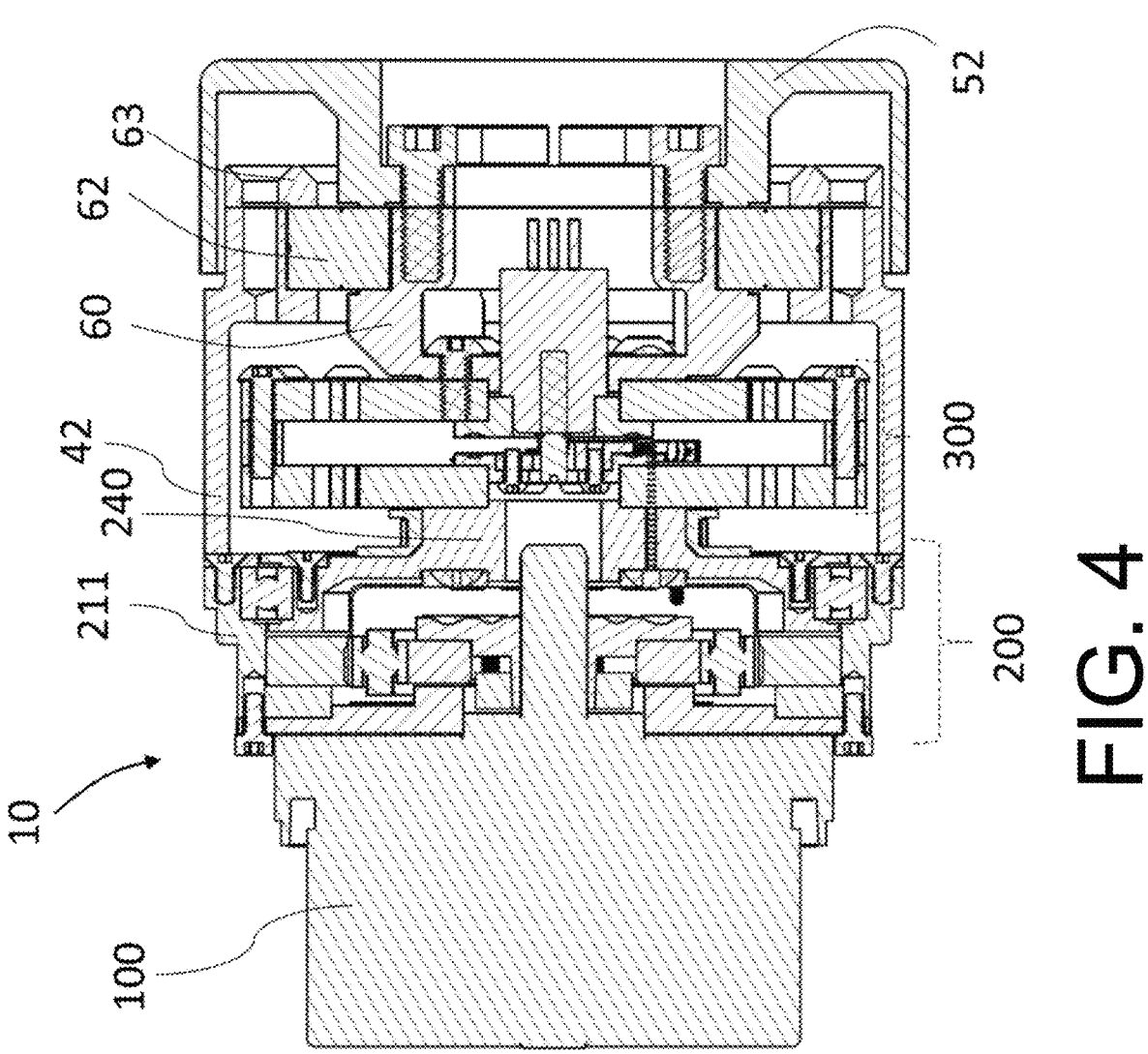
FIG. 4 illustrates a cross-section view of an example SEA with a robotic joint assembly according to some implemen-tations.

FIGS. 4 shows a cross-section view of an example embodiment of the SEA 10 with a joint assembly. As mentioned above, the SEA 10 includes a motor 100, gear transmission assembly 200, and spring assembly 300. The SEA housing frame 211 of the SEA 10 is attached to the joint housing body 42 and the spring assembly 300 is placed inside of the joint housing body 42. The output mount of the spring assembly 300 of the SEA 10 is coupled with the upper mount section 64 in FIG. 3 of the bore shaft 60 whose the other side mount is coupled with the other joint housing body 52. A round middle section of the bore shaft 60 is fitted in the inner race of the joint bearing 62 whose outer race is fixed at the joint housing body 42. The joint bearing 62 is preferably a cross roller bearing that supports all-directional loads from the link 50 in FIG. 3 only allowing free rotation with respect to the axis 30 in FIG. 2. Hence, the output mount of the spring assembly 300, the bore shaft 60, and the joint housing body 52 are rigidly connected and rotate together with respect to the joint housing 42. Relative to the joint housing body 42 or the SEA housing frame 211, the rotational angle of the joint housing body 52 is the sum of the transmission output part 240 and the rotational deflection of the spring assembly 300 between the input and output mount. With properly controlled motive force from the motor 100, the rotational deflection of the spring assembly 300 may be proportional to the applied torque to the joint housing body 52 with respect to the housing body 42.

Figure 5:
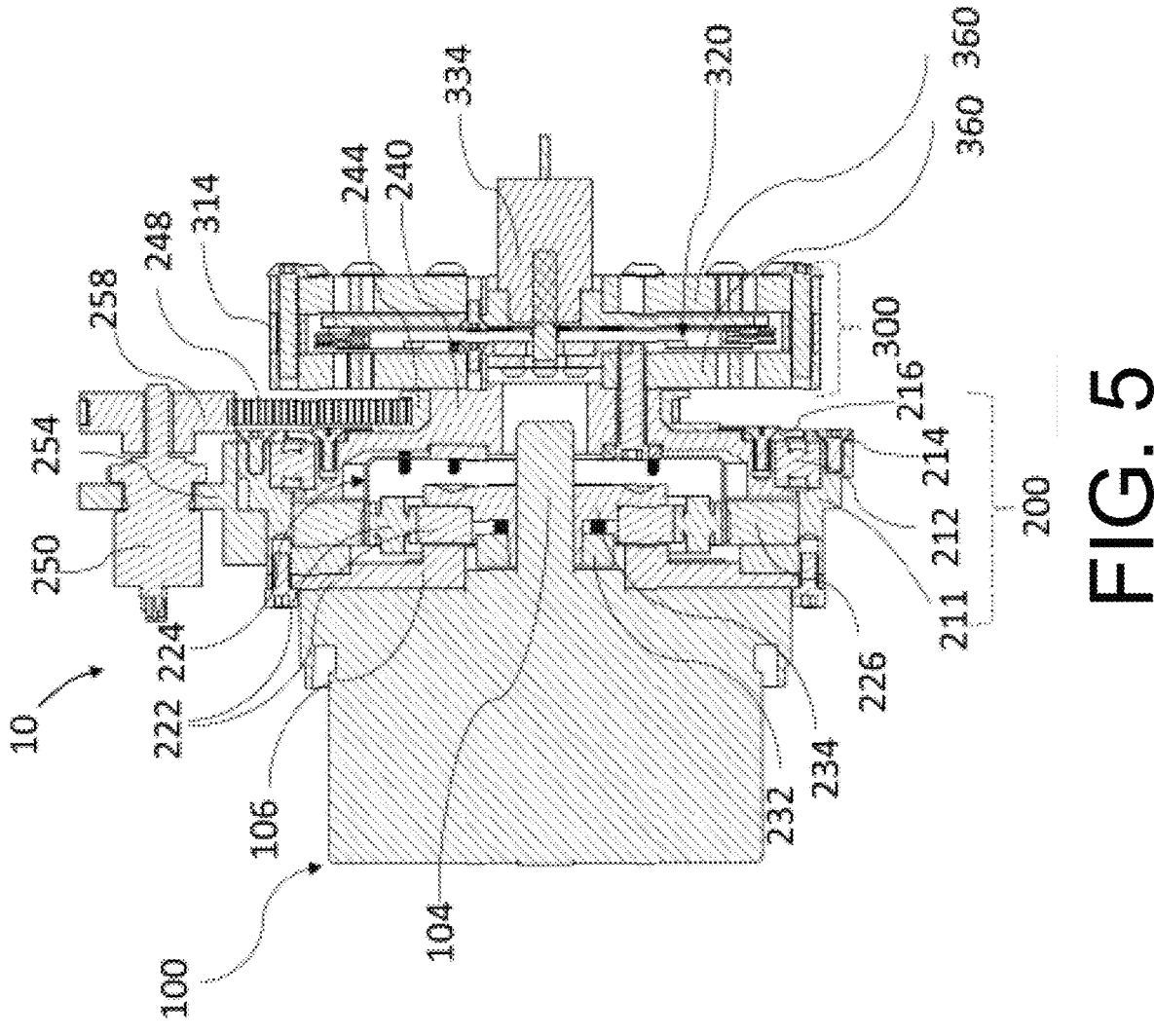
FIG. 5 illustrates a cross-section view of an example SEA excluding the robotic joint assembly according to some implementations.

More specifically, FIG. 5 shows a cross-section view in another plane of the SEA 10 without the joint assembly. While the stationary part of the motor 100 may be attached to a motor base 106, the motor shaft 104 is rigidly coupled with the input part of the gear transmission, the wave generator 222 of a Harmonic Drive, through a shaft coupler 234 and coupler clamp 232. The shaft coupler 234 is fixed with the wave generator 222. The shaft coupler 234 that slides on the motor shaft 104 has a tapering outer circumference with several slots in axial direction where the ring-shaped coupler clamp 232 that has a female portion of the tapering circumference sits on. Tightening a set of screws that connect the shaft coupler 234 and the coupler clamp 232 in axial direction shrinks the tapering outer circumference of the shaft coupler 234 and makes a rigid connection between the shaft coupler 234 and the motor shaft 104.

The circular spline 226 of a Harmonic Drive, a stationary part of the gear transmission, is fixed to the SEA housing frame 211. The flex spline 224, an output part of gear transmission, is attached to the input mount of spring assembly 300 through the transmission output part 240 that is grounded at the SEA housing frame 211 via a bearing 212. The bearing 212 is preferably a four-point contact thin section bearing or cross roller bearing and may be secured by an inner bearing cap 214 to the transmission output part 240 and by an outer bearing caps 216 to the SEA housing frame 211. The components of the Harmonic Drive are assembled in a common way where the toothed circumference part of the flex spline 224 is mated with the toothed part of the inner circumference of the circular spline 226 while the outer ring of the wave generator 222 slides into the inner circumference of the flex spline 224.

Still referring to FIG. 5, the transmission output part 240 may include a concentrically assembled timing belt pulley 244 that may be coupled with the sensor 250 via a sensor input pulley 258 and a timing belt 248. The sensor 250 may be fixed at the SEA housing frame 211 via a sensor holder 254. The sensor 250 is preferably an absolute encoder or potentiometer and may be used for reading the absolute angular position of link 50 in FIG. 3 with respect to the link 40 in FIG. 3. Further details with respect to the spring assembly 300 are discussed below with respect to FIGS. 8-19.

Figure 6:
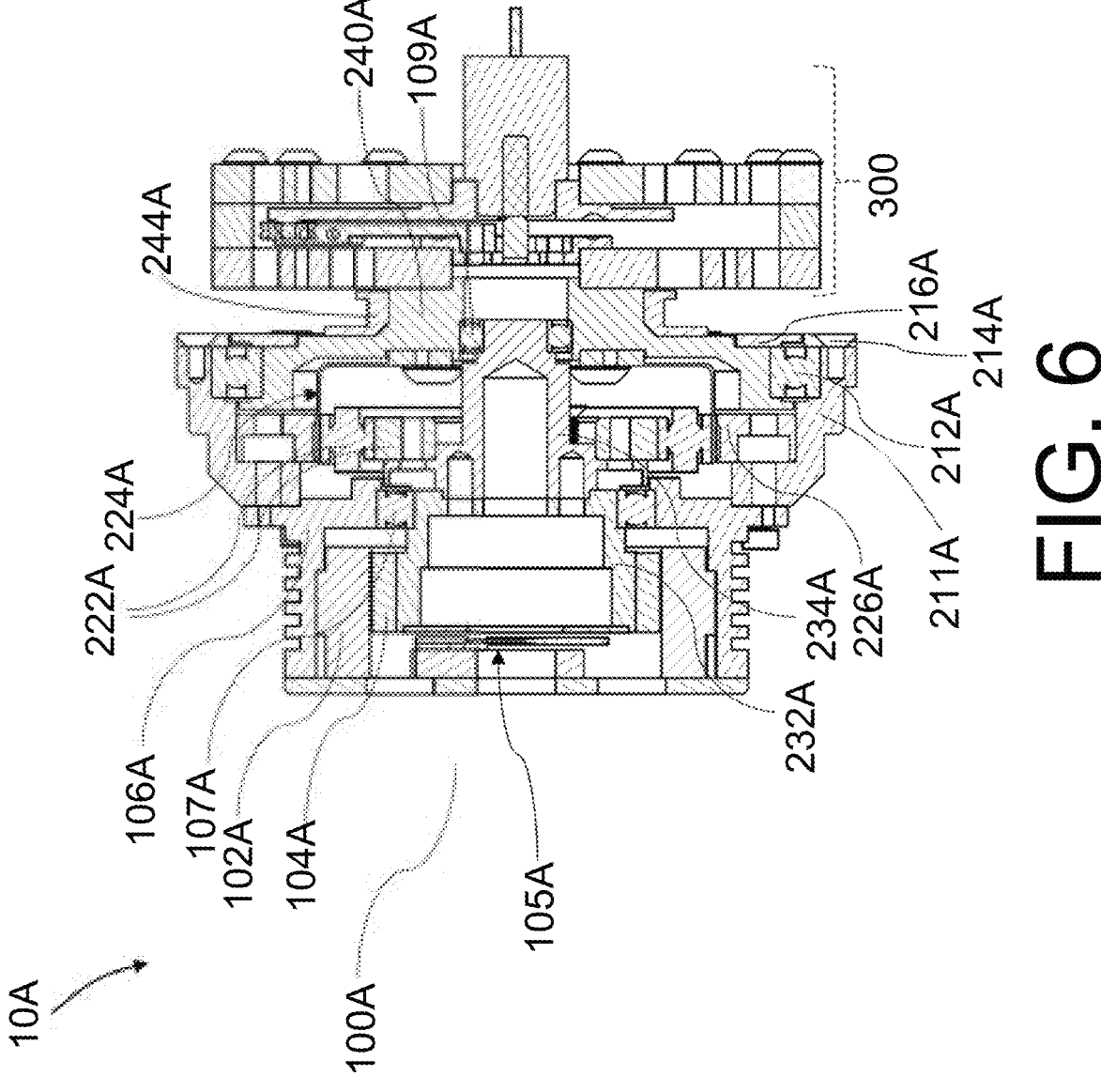
FIG. 6 illustrates another example cross-section view of a SEA without an attached joint assembly according to some implementations.

FIG. 6 illustrates a cross-section view of another example embodiment of the SEA 10A without a joint assembly attached. Similar to the example SEA 10 of FIGS. 4 and 5 above, the SEA 10A includes the stationary part (stator) 102A attached to a motor housing 106A, the motor rotor 104A is concentrically placed inside of the stator being attached to a motor rotor holder 232A. The motor rotor holder 232A is coupled with the motor housing via a bearing 107A so that the motor rotor 104A and the rotor holder 232A freely rotate with respect to the stator 102A. One side of the rotor holder 232A is fixed to a motor shaft 234A that is coupled with the input part of the gear transmission, the wave generator 222A of a Harmonic Drive. A contactless sensor 105A (e.g. quadrature encoder or an absolute encoder) consisting of a circular rotor and stationary part may be assembled to the other side of the rotor holder 232A. While the stationary part of the sensor 105A is attached to an extension of the motor housing 106A, the circular rotor of the sensor 105A is concentrically bonded to the rotor holder 232A. The sensor 105A may be used for motor commutation and/or sensing the position of the motor rotor 104A and the transmission output part 240A.

The circular spline 226A of a Harmonic Drive, a stationary part of gear transmission, is fixed to a SEA housing frame 211A where the motor housing 106A is attached. The flex spline 224A, an output part of gear transmission, is attached to the input mount of spring assembly 300 in FIG. 5 through the transmission output part 240A that is grounded at the SEA housing frame 211A via the bearing 212A. The bearing 212A is preferably a four-point contact thin section bearing or cross roller bearing and may be secured by an inner bearing cap 214A to the transmission output part 240A and by an outer bearing caps 216A to the SEA housing frame 211A. The motor shaft 234A may be extended and connected to the center hole of the transmission output part 240A via a bearing 109A to support the rotor holder 232A more securely against the motor stator 102A. The components of the Harmonic Drive are assembled in a common way where the toothed circumference part of the flex spline 224A is mated with the toothed part of the inner circumference of the circular spline 226A while the outer ring of the wave generator 222A slides into the inner circumference of the flex spline 224A.

The transmission output part 240A may include a concentrically assembled timing belt pulley 244A that may be coupled with the sensor 250 in FIG. 5 via a sensor input pulley and a timing belt. The sensor 250 may be fixed at the SEA housing frame 211A. The sensor 250 may be an absolute encoder or potentiometer and may be used for reading the absolute angular position of link 50 in FIG. 3 with respect to the link 40 in FIG. 3.

Figure 7:
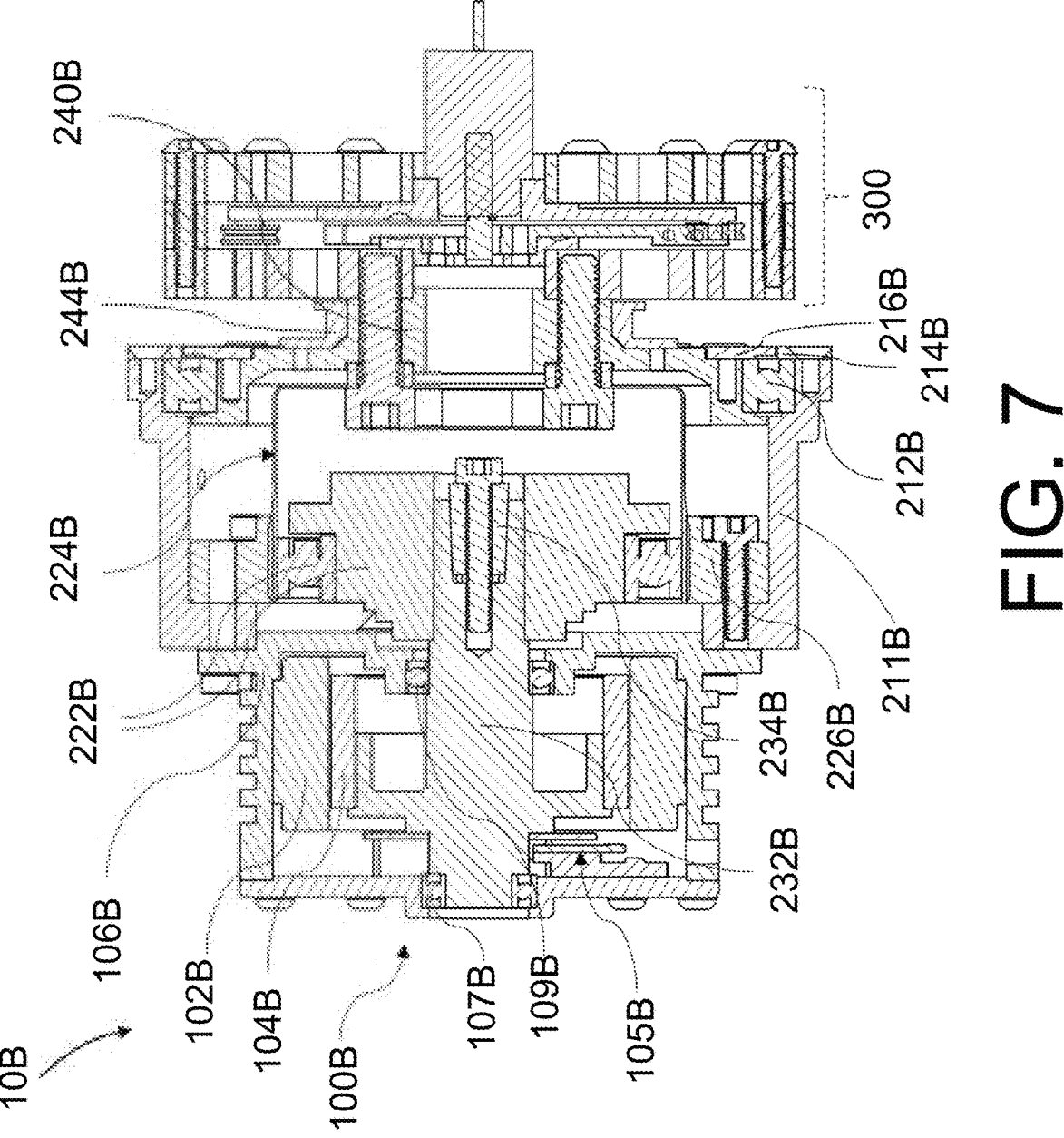
FIG. 7 illustrates yet another example cross-section view a SEA without an attached joint assembly according to some implementations.

FIG. 7 illustrates yet another a cross-section view of the other example embodiment of the SEA 10B without a joint assembly attached. While the stationary part (stator) 102B of the motor 100B is attached to a motor housing 106B, the motor rotor 104B is concentrically placed inside of the stator being attached to a motor rotor holder 232B. The motor rotor holder 232B is coupled with the motor housing via two bearings, 107B and 109B so that the motor rotor 104B and the rotor holder 232B freely rotate with respect to the stator 102B. One end of the rotor holder 232B is fixed to the input part of the gear transmission, the wave generator 222B of a Harmonic Drive. The one end of the rotor holder 232B that slides in a center hole of the wave generator 222B may have a tapering cylinder hole with several slots in axial direction where a tapering cylinder 234B, a male counterpart of the tapering cylinder hole, sits on. Tightening a set of screws that connect the rotor holder 232B and the tapering cylinder 234B in axial direction bulges out the tapering cylinder hole to the wall of the center hole of the wave generator 222B and makes a rigid connection between the rotor holder 232B and the wave generator 222B. A contactless sensor 105B (e.g. quadrature encoder or an absolute encoder) consisting of a circular rotor and stationary part may be assembled to the other side of the rotor holder 232B. While the stationary part of the sensor 105B is attached to an extension of the motor housing 106B, the circular rotor of the sensor 105B is concentrically bonded to the rotor holder 232B. The sensor 105B may be used for motor commutation and/or sensing the position of the motor rotor 104B and the transmission output part 240B.

The circular spline 226B of a Harmonic Drive, a stationary part of gear transmission, is fixed to a SEA housing frame 211B where the motor housing 106B is attached. The flex spline 224B, an output part of gear transmission, is attached to the input mount of spring assembly 300 in FIG. 5 through the transmission output part 240B that is grounded at the SEA housing frame 211B via the bearing 212B. The bearing 212B is preferably a four-point contact thin section bearing or cross roller bearing and may be secured by an inner bearing cap 214B to the transmission output part 240B and by an outer bearing caps 216B to the SEA housing frame 211B. The components of the Harmonic Drive are assembled in a common way where the toothed circumference part of the flex spline 224B is mated with the toothed part of the inner circumference of the circular spline 226B while the outer ring of the wave generator 222B slides into the inner circumference of the flex spline 224B.

The transmission output part 240B may include a concentrically assembled timing belt pulley 244B that may be coupled with the sensor 250 in FIG. 5 via a sensor input pulley and a timing belt. The sensor 250 may be fixed at the SEA housing frame 211B. The sensor 250 is preferably an absolute encoder or potentiometer and may be used for reading the absolute angular position of link 50 in FIG. 3 with respect to the link 40 in FIG. 3.

Figure 8:
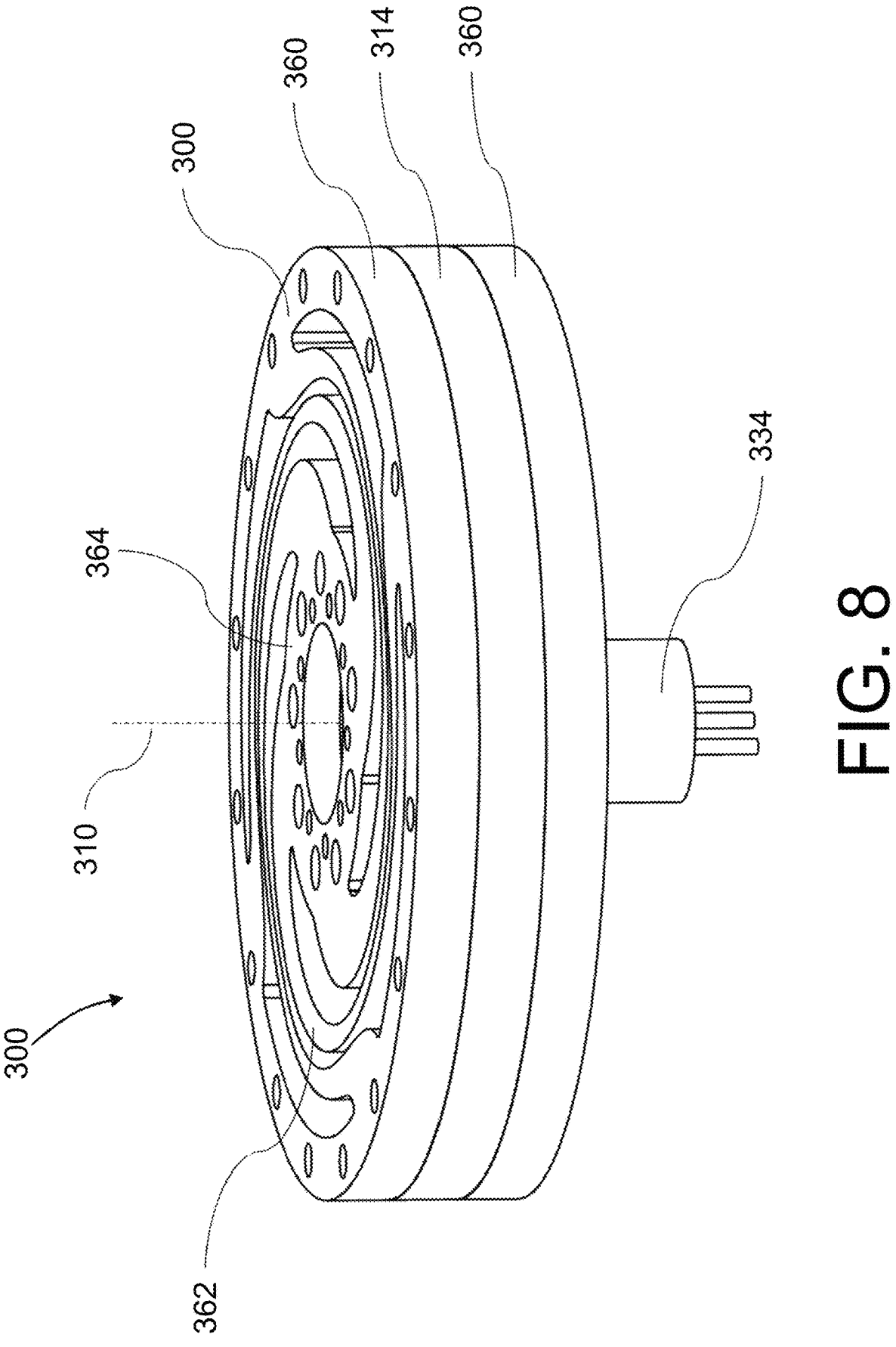
FIG. 8 illustrates an example spring assembly which may be incorporated into an SEA according to some implemen-tations.

FIG. 8 shows an example embodiment of the spring assembly 300 that includes two planar and circular-shaped torsional springs 360, spacer 314, and an internal mechanism 320, shown in FIG. 9 below, with a sensor 334 that detects the deflection of the springs. The planar and circular-shaped torsional springs 360 consist of a circular inner mount segment 364, a circular outer mount segment 366, and a set of elastically deformable spirals 362 that connect the inner and outer segments. The inner 364 and outer 366 mount segments are concentric. The outer segments 366 of the two springs are stacked concentrically and rigidly coupled with each other through the spacer 314. The internal mechanism 320, shown in FIG. 9 below, for detection of spring deflection is located between the two springs 360 and coupled with the sensor 334. The inner mount segments 364 of the two springs 360 are designated as the input and output mounts of the spring assembly 300, respectively. The inner mount segment 364 on the side of the sensor 334 may preferably be output mounts of the spring assembly 300 because of the convenience of cable routing for sensor 334.

Figure 9:
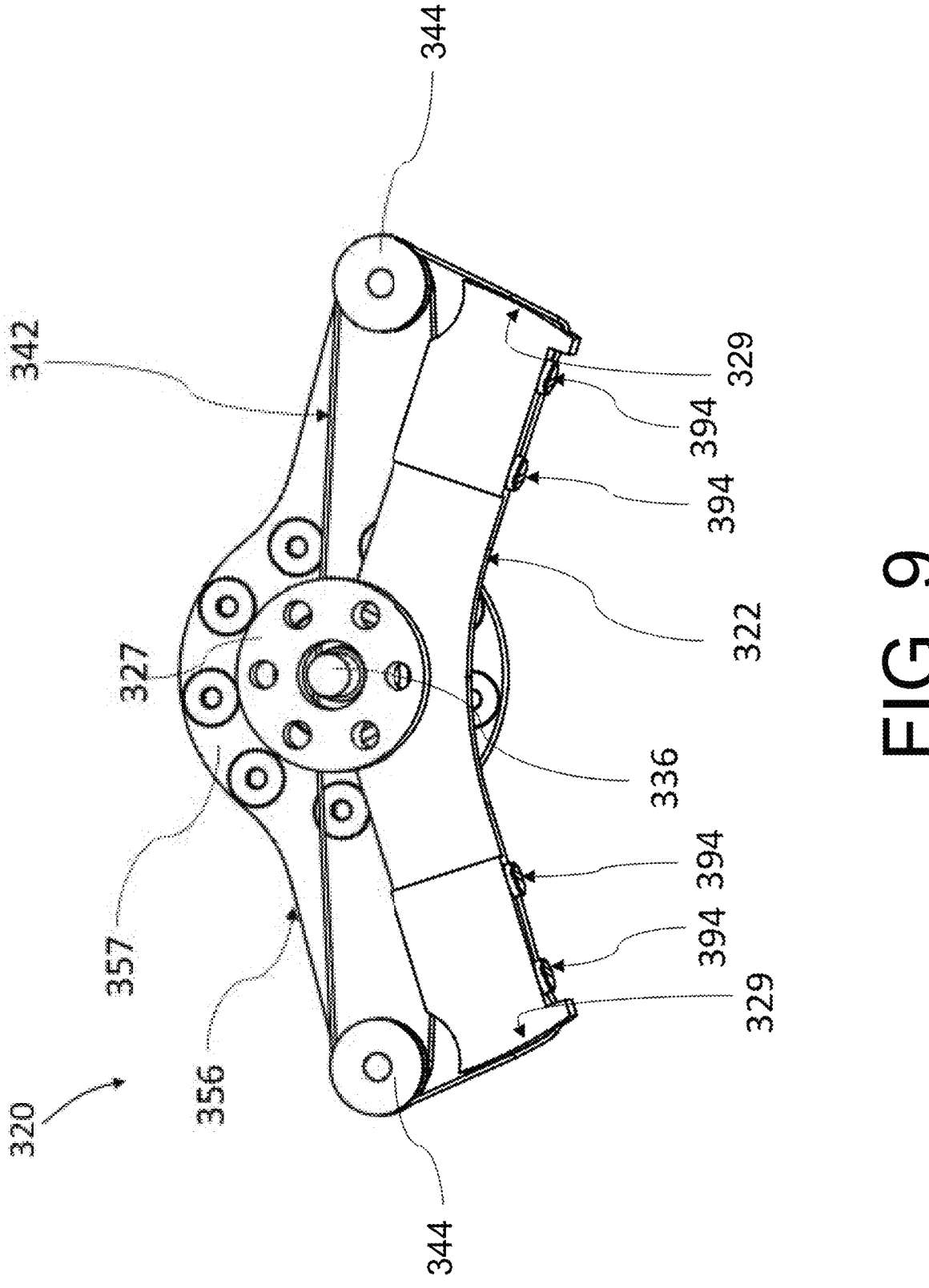
FIG. 9 illustrates an internal mechanism inside the spring assembly of the SEA according to some implementations.

FIG. 9 illustrates the internal mechanism 320 of the spring assembly 300 that may include a base arm 356, a swing arm 322, string 342, and pulleys 344. For example, the internal mechanism 320 may be positioned within the interior cavity of the spacer 314 within the spring assembly 300. The center part 357 of the base arm 356 may be fixed to the inside surface of the inner mount segment 364 of one spring 360. Two arms of the base arm 356 may outstretch above the spring surface no further than the inner diameter of the outer mount segment 366 of the spring 360 in FIG. 6. At both ends of the arms, two pulleys 344 may be connected to the base arm 356 via bearings for free rotation. A stationary part of the sensor 334 appeared in FIG. 6 may be attached to the center part 357 of the base arm concentrically to the inner mount segment 364 of the spring 360 in FIG. 6, having an exposer of a rotating shaft 336, as a sensor input, of the sensor 334 out of the base arm. The center part 327 of the swing arm 322 may be fixed to the inside surface of the inner mount segment 364 on the other spring in FIG. 6. Two arms of the swing arm 322 may outstretch above the other spring surface no further than the inner diameter of the outer mount segment 366 of the other spring 360. The end sections of the two arms of the swing arm 322 may be shaped as a circular arc whose center may coincide with the center of the inner mount segment 364 of the spring 360. The base arm 356 and swing arm 322 may be configured so that the end sections of the two arms of the swing arm 322 may be positioned at the same side against the stretched arms of the base arm and leveled with the two pulleys on the base arm, having no physical contact during their relative rotation with respect to the axis 310 that connects two center points of the two springs 360.

Still referring to FIG. 9, the string 342 (e.g. Vectran or Kevlar string) whose one end may be attached to the end of one arm of the swing arm 322, run through the circular arc 329 of the one arm of the swing arm 322 and the one pulley 344 on the base arm 356, wrap around the sensor shaft 336, run through the other pulley 344 on the base arm 356 and the circular arc 329 of the other arm of the swing arm, and be fixed at the end of the other arm of the swing arm 322. At the both ends of the swing arm, each end of the string 342 may be attached to the swing arm body using a couple of screws. During the fixation, the string may be properly tensioned. When the swing arm 322 (or the inner mount segment 364 of the spring 360) rotates against the base arm (or the inner mount segment 364 of the other spring 360) during an elastic deflection of the springs 360, the relative rotation of the swing arm 322 may be amplified and delivered to the rotating shaft 336 of the sensor 334. The factor of amplification may be proportional to the ratio between the radius of the circular arc at the swing arm and the radius of the sensor shaft 336. The ratio of the amplification may be between 1:5 and 1:30. In this embodiment, the mechanism 320 has ratio of approximately 1:16 making total of approximately 18-bit resolution in detecting the spring deflection when combined with a 14-bit absolute encoder of sensor 334. If the spring assembly 360 has 400 Nm/rad in stiffness, the mechanism 320 with 18-bit resolution can detect approximately 0.01 Nm of change in torque applied to the spring assembly. In other examples, the mechanism 320 may have a ratio in the range of approximately 1:8 to 1:24 and the spring assembly 360 may have a stiffness in the range of approximately 200 Nm/rad to approximately 600 Nm/rad. In some specific instances, the mechanism 320 may have a stiffness in the range of approximately 200 Nm/rad to approximately 900 Nm/rad.

Figure 10:
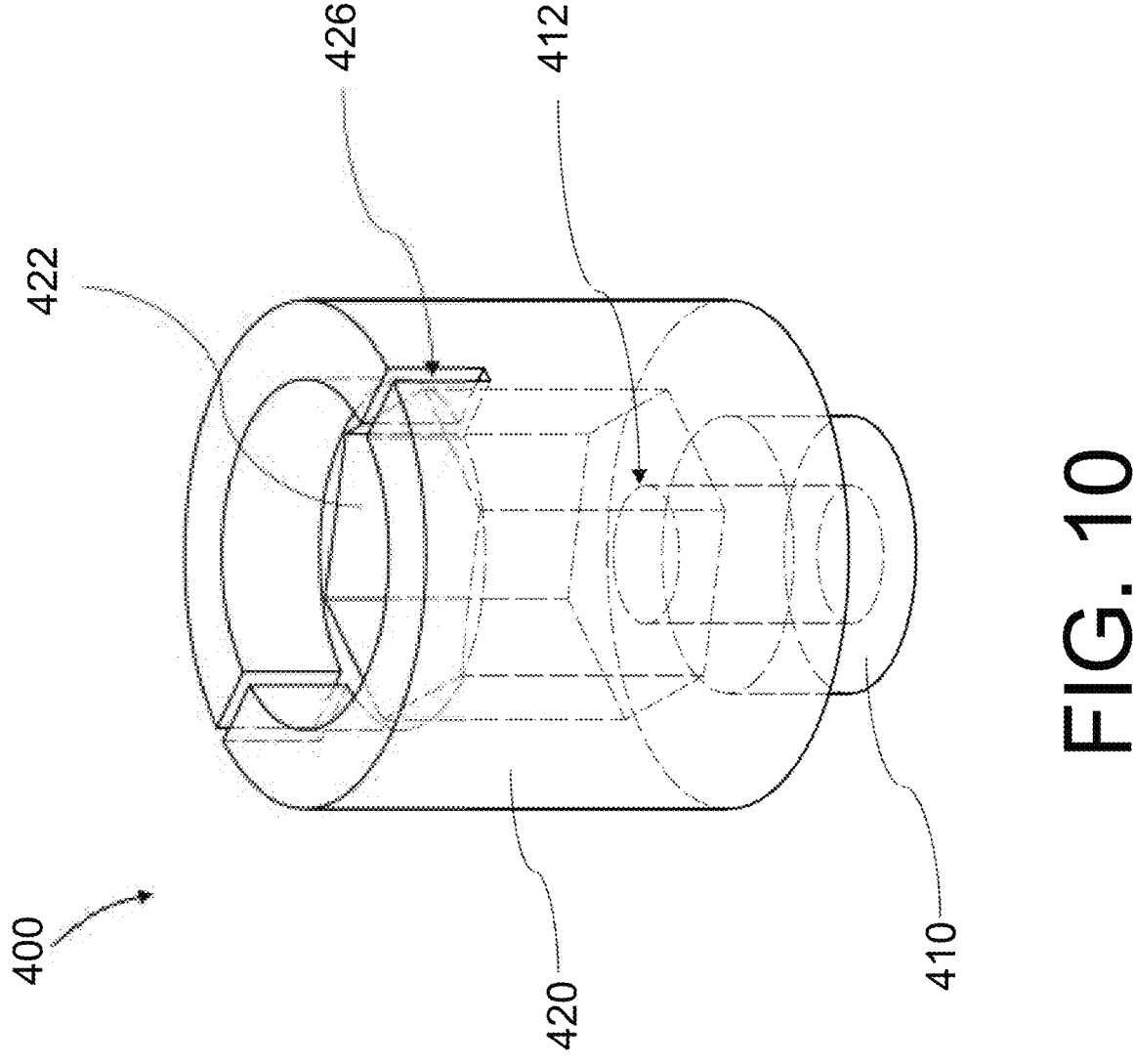
FIG. 10 illustrates an example a tool tip that is designed to tighten the string in the internal mechanism of the spring assembly according to some implementations.

As a detailed description of tensioning string, FIG. 10 shows a tool tip 400 that is designed to tighten the string 342 in FIG. 9 during assembly process. Having one end of the string 342 fixed with two screws 394 at the end of one arm of the swing arm 322 in FIG. 9, the other end of the string may be tightened and fixed to the end of the other arm of the swing arm 322 using the tool tip 400 and two screws 394, shown in FIG. 9 above. The tool tip 400 may have a small cylinder portion 410 and a large cylinder portion in a unibody that are arranged in axial direction concentrically. At the large cylinder, there may be an open hole 422 for hex key or equivalent and one or more slots 426 at the end of the cylinder where the string 342 can be caught. The small cylinder portion has a concentric through hole for screw 394. In the process of routing the string 342 around the mechanism 320, shown in FIG. 9 above, at the end of the other arm of the swing arm 322, the outside screw 394 that is closer to the circular arc 329 is loosely tightened so that there is a gap between the screw head and the swing arm body. Another screw 394 inserted in the hole 412 from the hex hole 422 side is mildly tightened to the swing arm body so that the tool tip 400 is coupled to the swing arm body at the spot of the inside screw 394. The string 342, then, wraps around the outside screw under the screw head and around the small cylinder portion 410 and is fixed in the slot 426. Raveling the string 342 around the small cylinder 410 by rotating the tool tip 400 with a hex key or equivalent inserted in the hole 422 tensions the string. During the tensioning process, friction at the mating surface between the tool tip and the swing arm body prevents the tool tip 400 from rotating in unraveling direction. Once the string 342 is tensioned, the outside screw 394 is firmly tightened to affix the string 342 to the swing arm body 322. For secured affixation, the tool tip 400 may be removed and another screw 394 may affix again the string end hanging after the first affixation.

Figure 11:
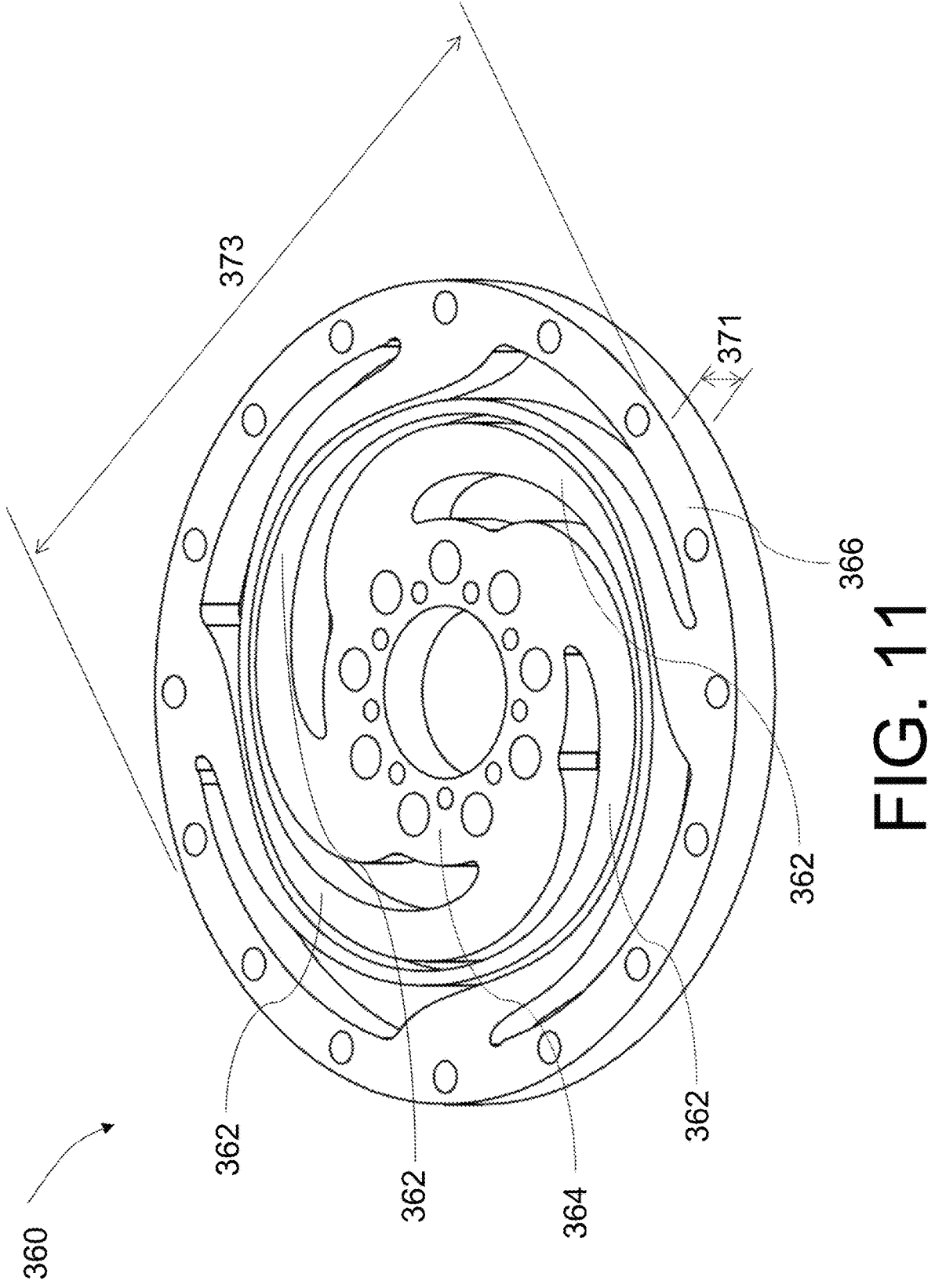
FIG. 11 illustrates an example disc-shaped spring of the spring assembly of the SEA according to some implemen-tations.
Figure 12:
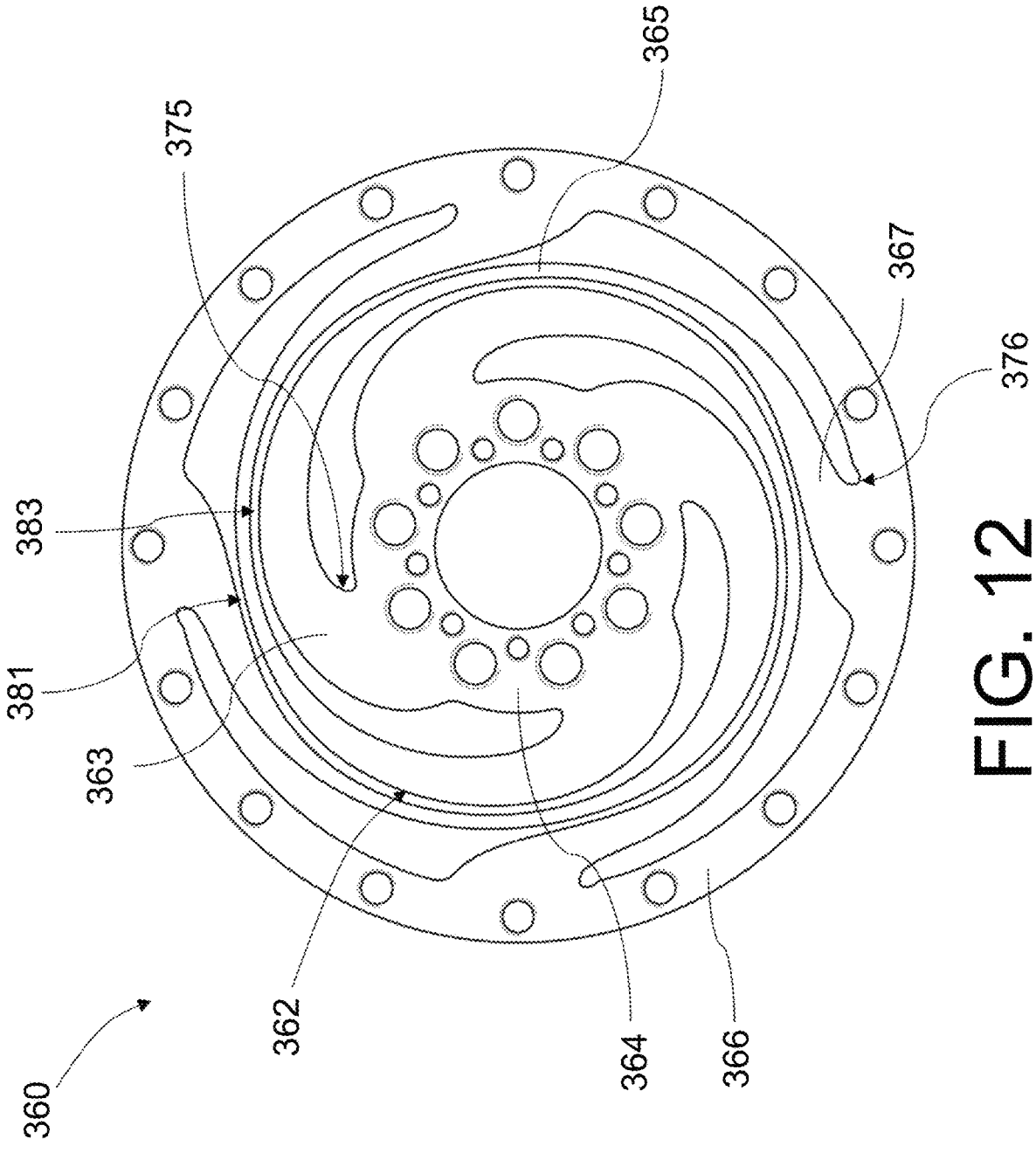
FIG. 12 illustrates an example a top view a disc-shaped spring of the spring assembly of an SEA according to some implementations.

As a description of the spring 360 in FIG. 6, FIGS. 11-14 shows the details of example embodiments of a disc-shaped spring 360. As mentioned above, the spring 360 may include a circular inner mount segment 364, a circular outer mount segment 366, and a set of deformable spirals 362 that connect the inner and outer mount segments. The inner mount segment 364 and the outer mount segment 366 are shaped as concentric circular hoops. In the inner 364 and outer 366 mount segments, there may be several through-holes and screw-holes to connect the other parts. The diameter 373 and thickness 371 of the spring 360 may depend on intended rotational stiffness, maximum allowable torque, the shape of the deformable spiral, and strength of material. For example, the deformable spirals 362 may be formed from steel alloy materials. In FIGS. 11 and 12, the spring 360 is approximately 76 milli-meter (mm) in diameter and approximately 5 mm in thickness has approximately 800 Nm/rad in stiffness and approximately 35 Nm of maximum allowable torque with a safety factor of over 2 based on yield strength of preferred materials (e.g. Maraging steel C300 or 17-4 stainless steel with H-900 condition). Therefore, the spring assembly 300 in FIG. 8 that includes a serial connection of two springs 360 has approximately 400 Nm/rad in stiffness and around 35 Nm of maximum allowable torque.

Figure 13:
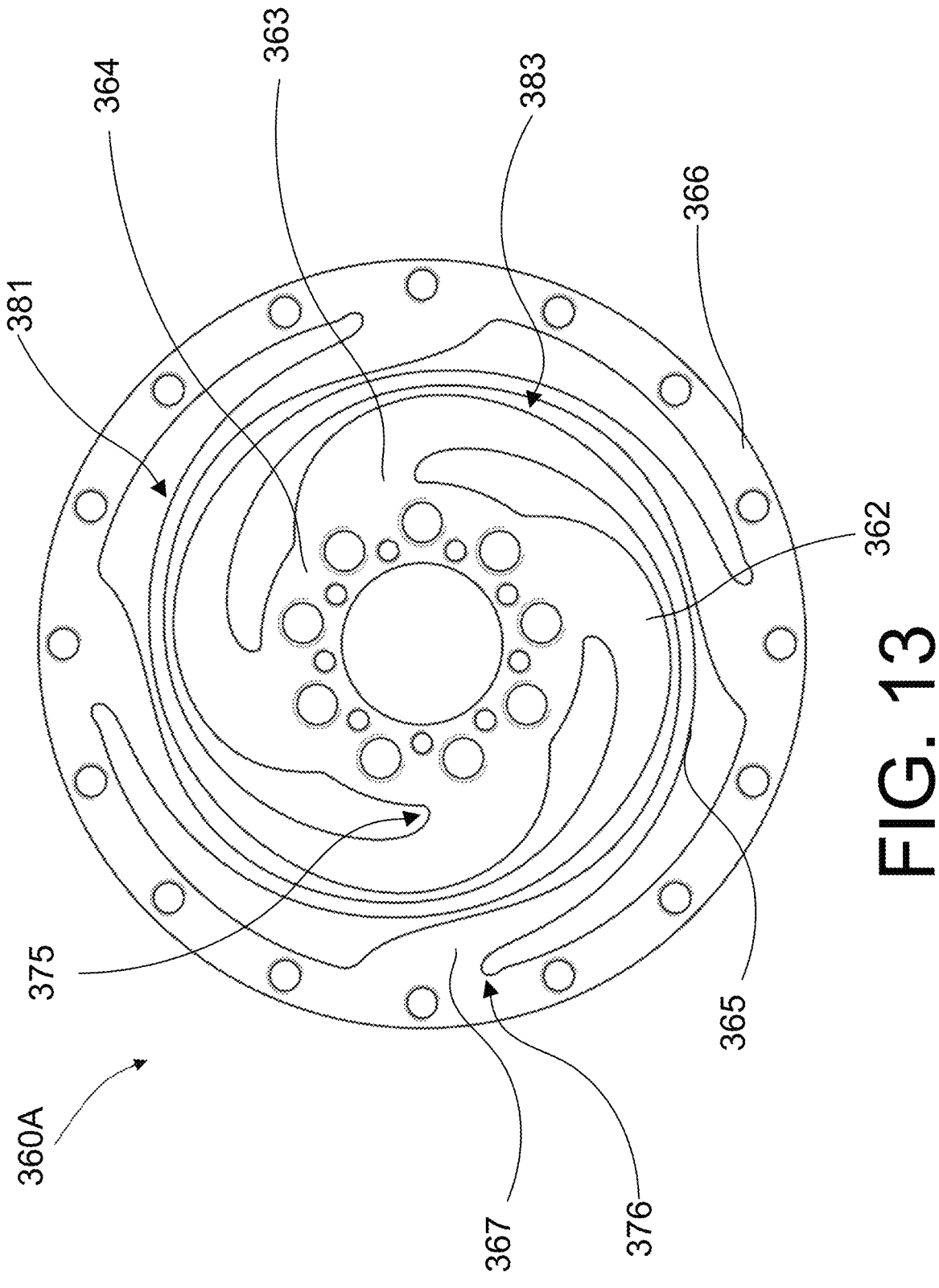
FIG. 13 illustrates another example disc-shaped spring of the spring assembly of an SEA according to some imple-mentations.

As another example embodiment of the spring 360, with changes in the shape of the spirals, the spring 360A in FIG. 13 has the same outer diameter and thickness but has approximately 1000 Nm/rad in stiffness and around approximately 50 Nm of maximum allowable torque with a safety factor of over 2 for the same materials above. So, the spring assembly 300 of FIG. 8 including a serial connection with the two springs 360A has approximately 500 Nm/rad in stiffness and approximately 50 Nm of maximum allowable torque. Another variation in the spring design is the thickness which is proportional to the spring stiffness in the same configuration. For example, if a spring having the same contour with the spring 360A has approximately 6 milli-meter in thickness, the spring has approximately 1200 Nm/rad in stiffness and around 60 Nm of maximum allowable torque, leading to approximately 600 Nm/rad in stiffness for the spring assembly 300 in FIG. 8. Thus, in some examples, the spring may have a diameter of between 60 mm and 90 mm and a thickness between 2 mm and 8 mm. In these examples, the stiffness of the spring may vary between 200 Nm/rad and 1200 Nm/rad and between 25 Nm and 60 Nm of maximum allowable torque. In other instances, the stiffness of the spring may vary between 400 Nm/rad and 1800 Nm/rad and between 20 Nm and 100 Nm of maximum allowable torque.

The spirals 362 have an inner thick section 363 close to the inner mount segment 364, a middle thin section 365, and an outer thick section 367 close to the outer mount segment 366. When the thickness is measured in perpendicular to the center line between the two border splines of the spiral, the thickness ratio among the thickest part of the inner thick section 363, the thinnest part of the middle thin section 365, and the thickest part of the outer thick section 367 is around 10:1:9 for spring 360 in FIG. 12 and around 9:1:8 for spring 360A in FIG. 13. Also, the thinnest thickness of the middle thin section 365 is around 1.36 mm for spring 360 in FIG. 12 and around 1.47 mm for spring 360A in FIG. 13. In some examples, the middle thin section may be between 1.00 mm and 1.70 mm for either spring 360 or 306A. The spirals 362 that start from the inner mount segment 364 may circle around the inner mount segment 364 while continuously approaching the outer mount segment 366. The spirals are configured to circle around as much as possible (more than half circle in the spring 360 and 360A) without touching each other and to take a major portion of the inside area between the inner 364 and outer 366 mount segments to minimize the diameter 373 and thickness 371 of the spring 360 in FIG. 13 at given stiffness and maximum allowable torque. The splines of the spirals are configured so that the deformation of the spirals may occur evenly throughout the spiral body without stress concentration during a torque exertion between the inner 364 and the outer 366 mount segments. The curvature of the inner sharp corner 375 and outer sharp corner 376 may be designed to avoid stress concentration.

Figure 14:
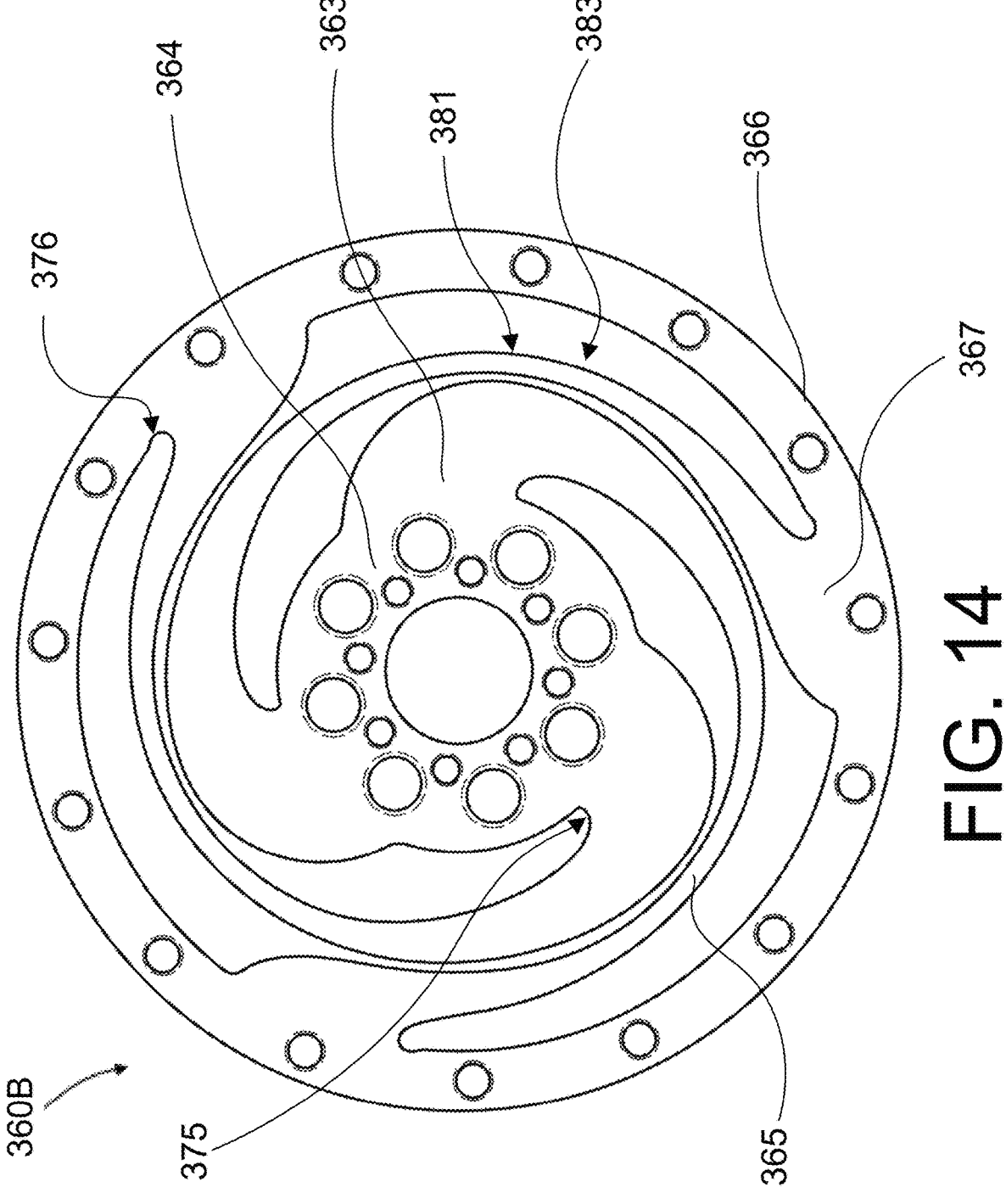
FIG. 14 illustrates another example disc-shaped spring of the spring assembly of an SEA according to some imple-mentations.

FIG. 14 illustrates another example disc-shaped spring of the spring assembly 300 of an SEA 10 according to some implementations. As another example embodiment of the spring 360B, with changes in the shape of the spirals and the number of the spirals, the spring 360B in FIG. 14 has a smaller outer diameter but the same thickness as the springs 360 and/or 360A. For example, the diameter of the spring 360B may be 66 mm and the thickness may be 5 mm but has approximately 820 Nm/rad in stiffness and around approximately 30 Nm of maximum allowable torque with a safety factor of over 2 for the same materials as springs 360 and/or 360A above.

It should be understood, that while the springs 360, 360A, and 360B discussed above are three examples springs that may be used in conjunction with the SEA 10, that other arrangements of the springs 360 may also be used. For example, a spring having five or more deformable spirals may be used.

Figure 15:
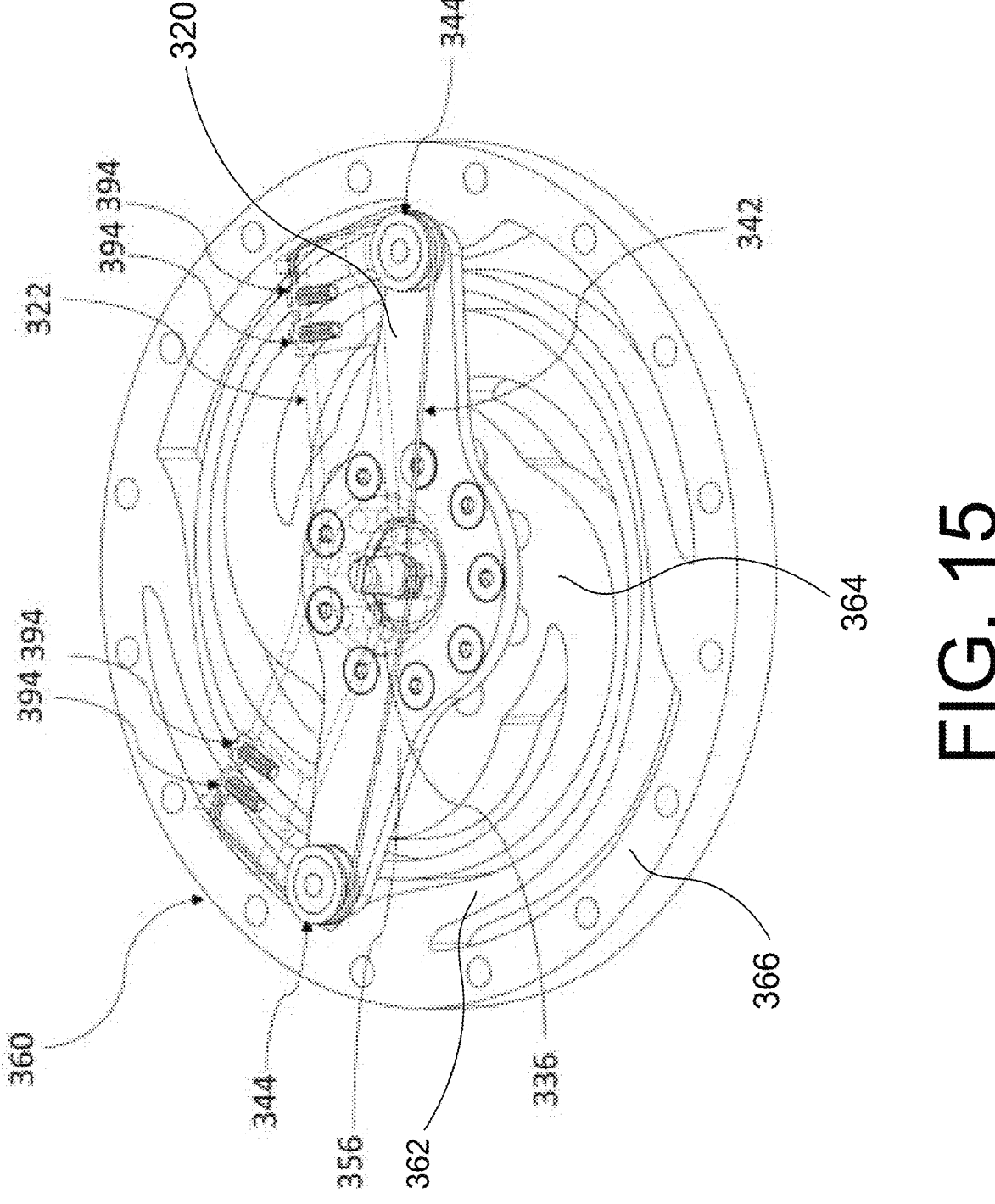
FIG. 15 illustrates an example internal mechanism and a bottom torsional spring of a disc-shaped spring of a spring assembly of an SEA according to some implementations.

FIG. 15 illustrates an example internal mechanism 320 and a bottom torsional spring 360 of a disc-shaped spring of a spring assembly of an SEA according to some implementations. The spring 360 may include a circular inner mount segment 364, a circular outer mount segment 366, and a set of deformable spirals 362 that connect the inner and outer mount segments. The internal mechanism 320 may include a base arm 356, a swing arm 322, string 342, and pulleys 344. As shown, the internal mechanism 320 is positioned over the bottom spring 360 within the interior cavity created by the spacer 314. In the current example, at both ends of the arms, two pulleys 344 may be connected to the base arm 356 via bearings for free rotation. Again, FIG. 10 shows a tool tip 400 that is designed to tighten the string 342 fixed by the screws 394 at the end of each arm of the swing arm 322.

Figure 16:
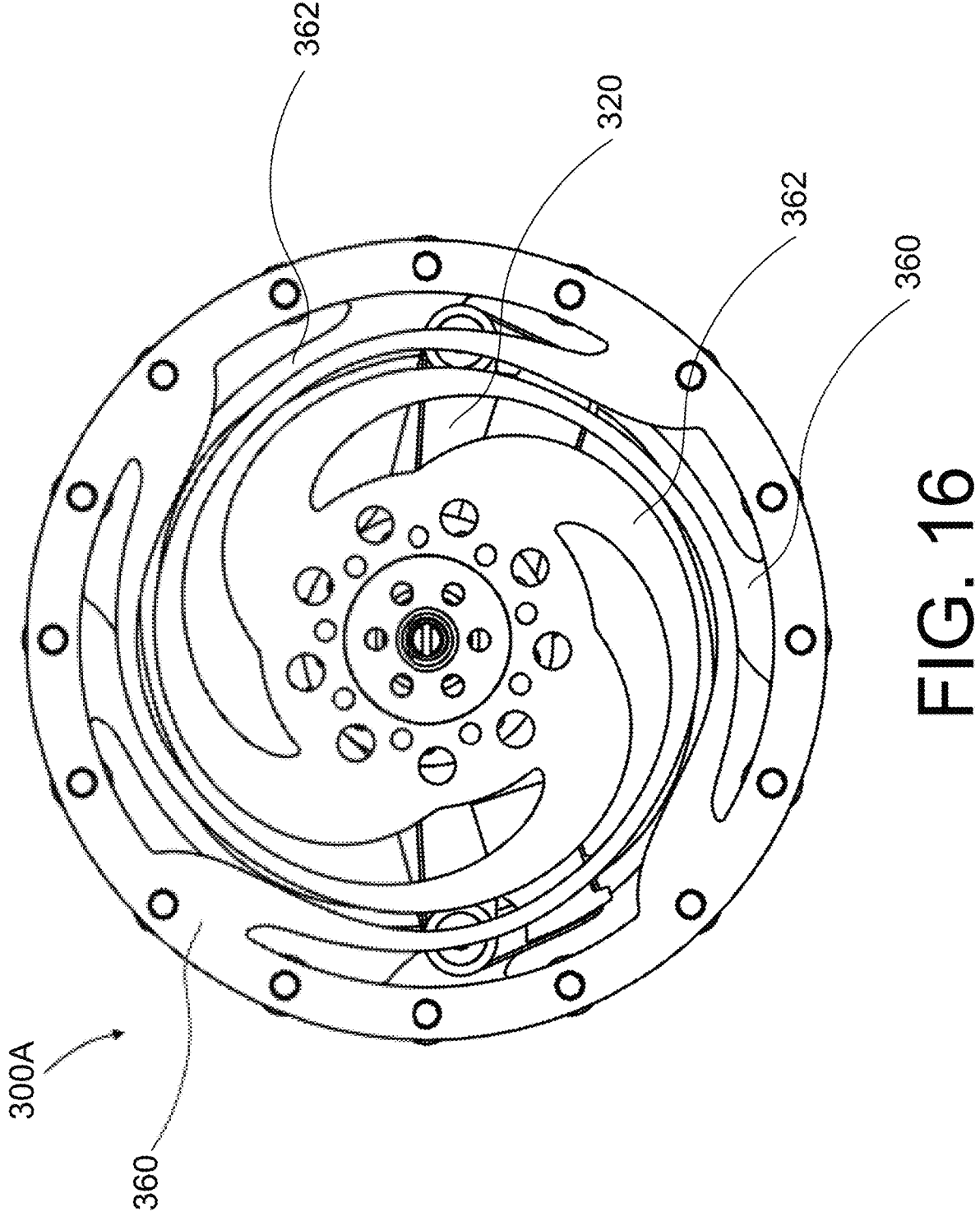
FIG. 16 illustrates an example arrangement of the spring assembly of an SEA according to some implementations.
Figure 17:
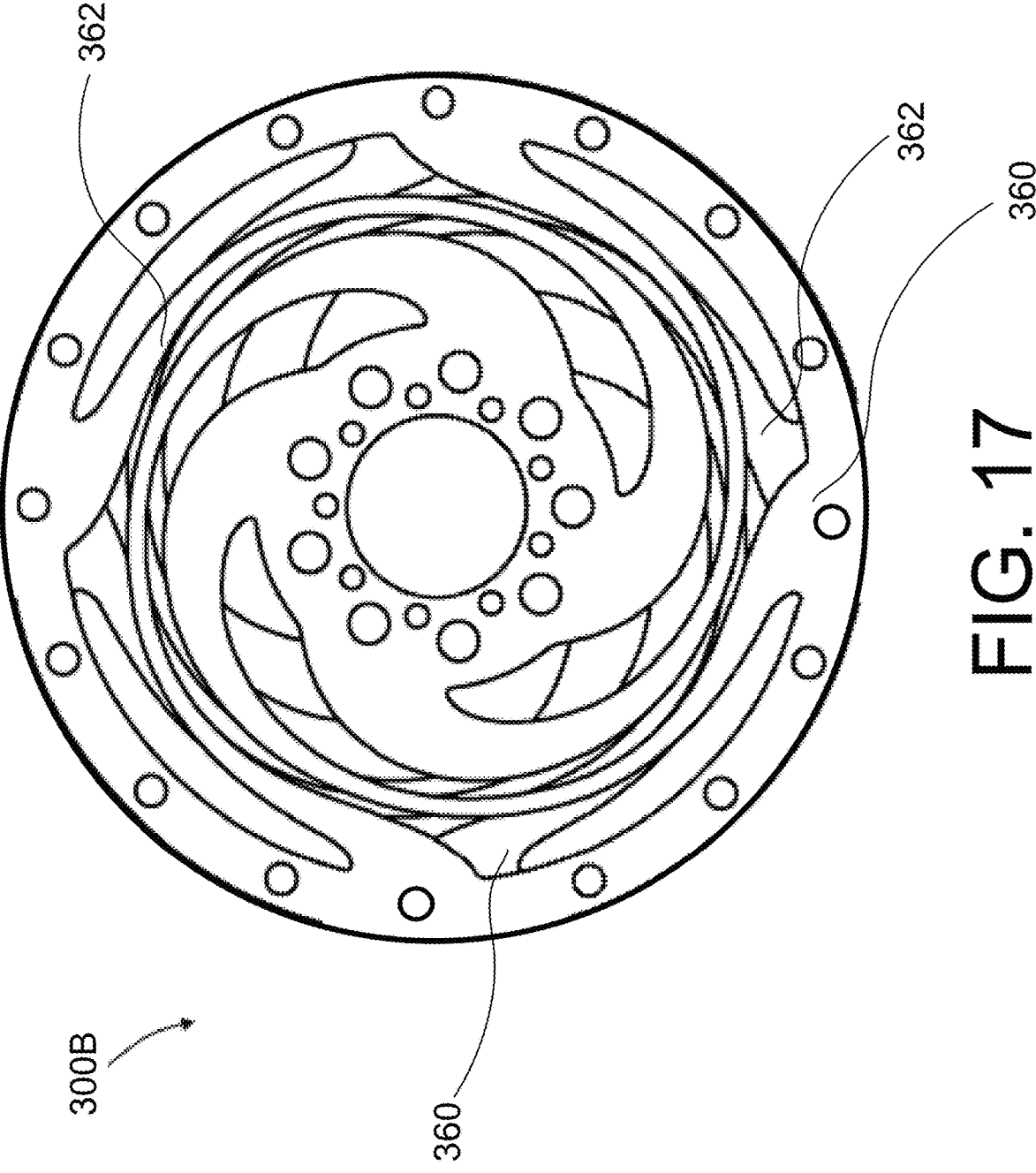
FIG. 17 illustrates another example arrangement of the spring assembly of an SEA according to some implemen-tations.

FIGS. 16 and 17 illustrate example arrangements of the spring assembly 300A and 300B of an SEA 10 according to some implementations. In the spring assembly 300A the spirals 362 of both the top and bottom spring 360 are arranged in the same direction. However, the springs 360 are offset by 90 degrees from each other, such that the spirals 362 are also offset by 90 degrees. In the spring assembly 300B, the top and bottom springs are aligned along X and Y axes (e.g., not offset from each other) but the spirals 362 are arranged in opposing directions.

It should be understood, that while the spring assemblies 300A and 300B discussed above are two examples assemblies that may be used in conjunction with the SEA 10, that other arrangements of the springs assembly 300 may also be used. For example, the spring assembly 300 may have a pair of matching springs 360 that may be positioned in the same direction with the spirals aligned along X and Y axes. In another example, the spring assembly 300 may utilize two different springs, such as spring 300A and 300B.

Figure 18:
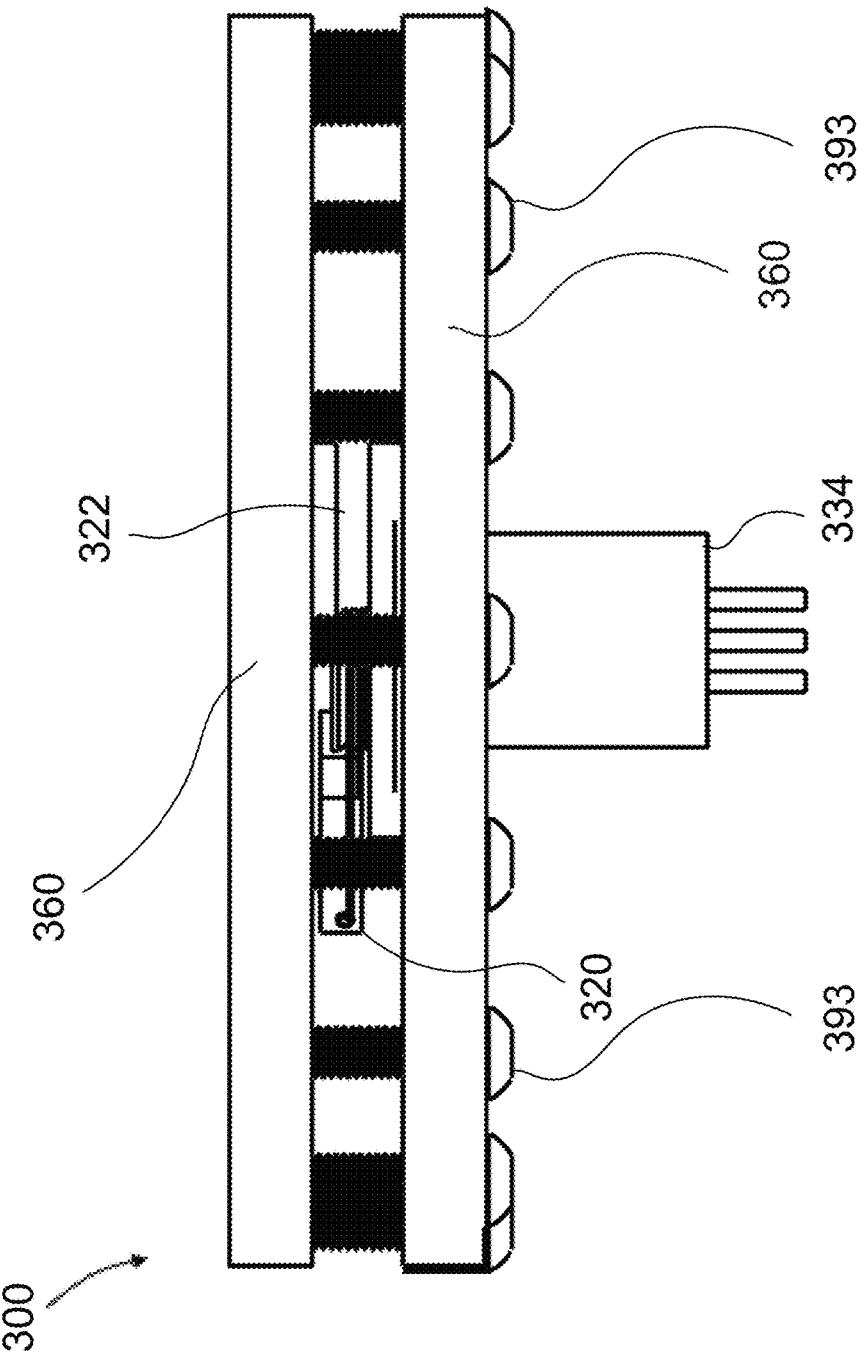
FIG. 18 illustrates a side view of the spring assembly of an SEA with the spacer 314 removed according to some implementations.

FIG. 18 illustrates a side view of the spring assembly 300 of an SEA 10 with the spacer 314 removed according to some implementations. In the current example, the spring assembly 300 include two planar and circular-shaped torsional springs 360 and an internal mechanism 320 with a sensor 334 that detects the deflection of the springs 360. As shown, the two springs are stacked concentrically and offset from each other in the Z direction. The two springs 360 are also rigidly coupled with each other via fasteners 393 that extend through both springs 360 and the spacer 314, as illustrated with respect to FIG. 19 below. In general, the internal mechanism 320 located between the two springs 360 is configured to detect the deflection of springs 360 with the sensor 334. In some cases, a swing arm 322 of the internal mechanism 320 may be positioned within the interior cavity of the spacer 314.

Figure 19:
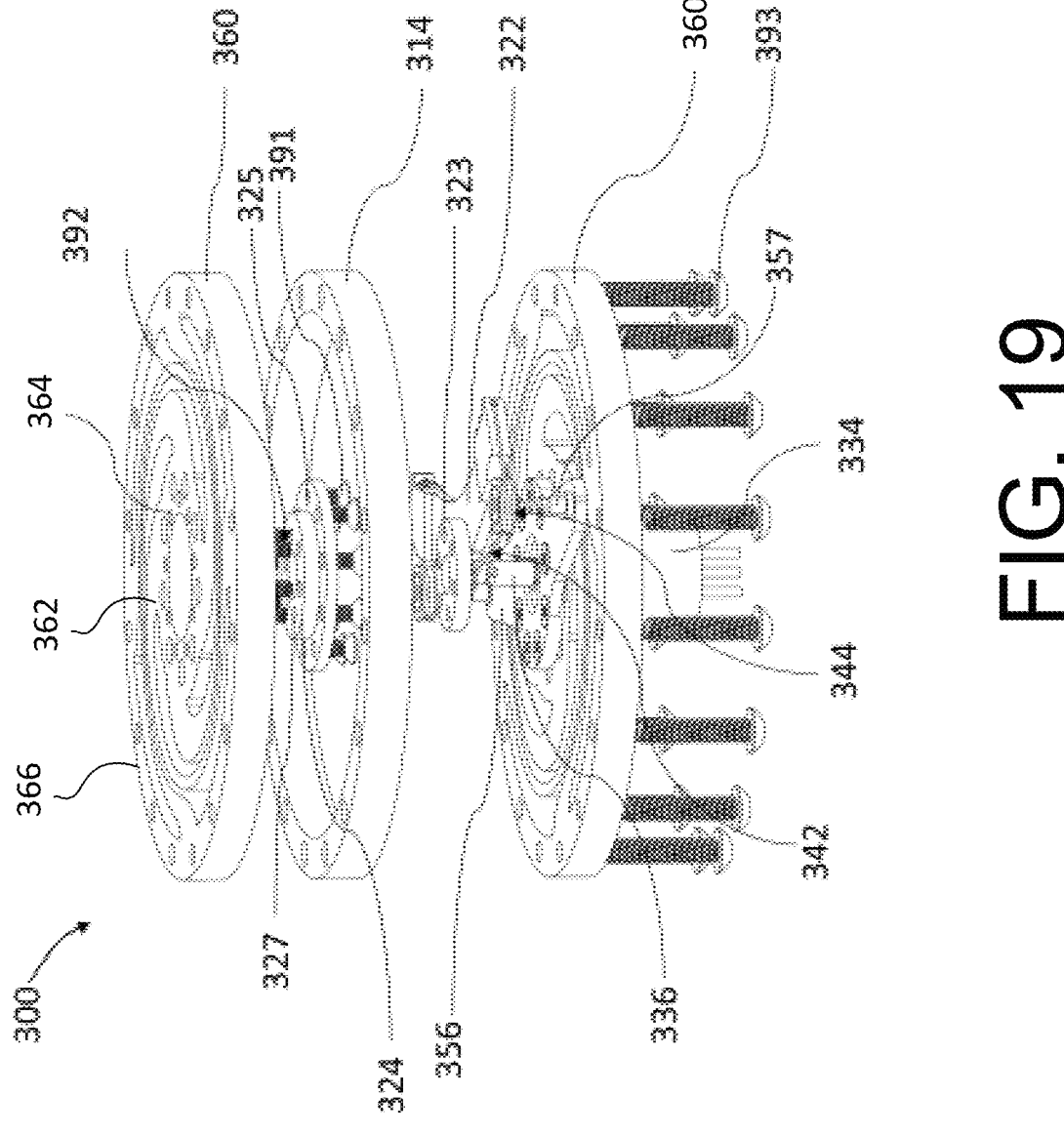
FIG. 19 illustrates an example exploded view of a spring assembly of an SEA according to some implementations.

FIG. 19 illustrates an example exploded view of a spring assembly 300 of an SEA 10 according to some implementations. The spring assembly 300 that includes two planar and circular-shaped torsional springs 360, spacer 314, and an internal mechanism 320 with a sensor 334 that detects the deflection of the springs. Each of the planar and circular-shaped torsional springs 360 consist of a circular inner mount segment 364, a circular outer mount segment 366, and a set of elastically deformable spirals 362 that connect the inner and outer segments. The outer segments 366 of the two springs are stacked concentrically and rigidly coupled with each other through the spacer 314. The internal mechanism 320 for detection of spring deflection is located between the two springs 360 and coupled with the sensor 334. The inner mount segments 364 of the two springs 360 are designated as the input and output mounts of the spring assembly 300, respectively. The inner mount segment 364 on the side of the sensor 334 may preferably be output mounts of the spring assembly 300 because of the convenience of cable routing for sensor 334. In the current example, the springs 360 are aligned such that the respective sets of elastically deformable spirals 362 run in opposing direction. However, in other implementations, the springs 360 are aligned such that the respective sets of elastically deformable spirals 362 run in the same direction or are stacked.

In some cases, the internal mechanism 320 of the spring assembly 300 that may include a base arm 356, a swing arm 322, and pulleys 344. For example, the internal mechanism 320 may be positioned within the interior cavity of the spacer 314, as shown, within the spring assembly 300. The base arm 356 may be fixed to the inside surface of the inner mount segment of the springs 360. Two arms of the base arm 356 may outstretch above the spring surface no further than the inner diameter of the outer mount segment of the spring 360. At both ends of the arms, two pulleys 344 may be connected to the base arm 356 via bearings for free rotation. A stationary part of the sensor 334 may be attached to the base arm concentrically to the inner mount segment of the spring 360.

When the swing arm 322 rotates against the base arm 356 during an elastic deflection of the springs 360, the relative rotation of the swing arm 322 may be amplified and delivered to the rotating shaft 336 of the sensor 334. The factor of amplification may be proportional to the ratio between the radius of the circular arc at the swing arm and the radius of the sensor shaft 336. The ratio of the amplification may be between 1:5 and 1:30. In some cases, the mechanism 320 has ratio of approximately 1:16 making total of approximately 18-bit resolution in detecting the spring deflection when combined with a 14-bit absolute encoder of sensor 334. For instance, if the spring assembly 360 has 400 Nm/rad in stiffness, the mechanism 320 with 18-bit resolution can detect approximately 0.01 Nm of change in torque applied to the spring assembly. In other examples, the mechanism 320 may have a ratio in the range of approximately 1:8 to 1:24 and the spring assembly 360 may have a stiffness in the range of approximately 200 Nm/rad to approximately 900 Nm/rad.

As mentioned above, the springs 360 may include a circular inner mount segment 364, a circular outer mount segment 366, and a set of deformable spirals 362 that connect the inner and outer mount segments. The inner mount segment 364 and the outer mount segment 366 are shaped as concentric circular hoops. In the inner 364 and outer 366 mount segments, there may be several through-holes and screw-holes to connect the other parts. The diameter 373 and thickness 371 of the spring 360 may depend on intended rotational stiffness, maximum allowable torque, the shape of the deformable spiral, and strength of material.

Figure 20:
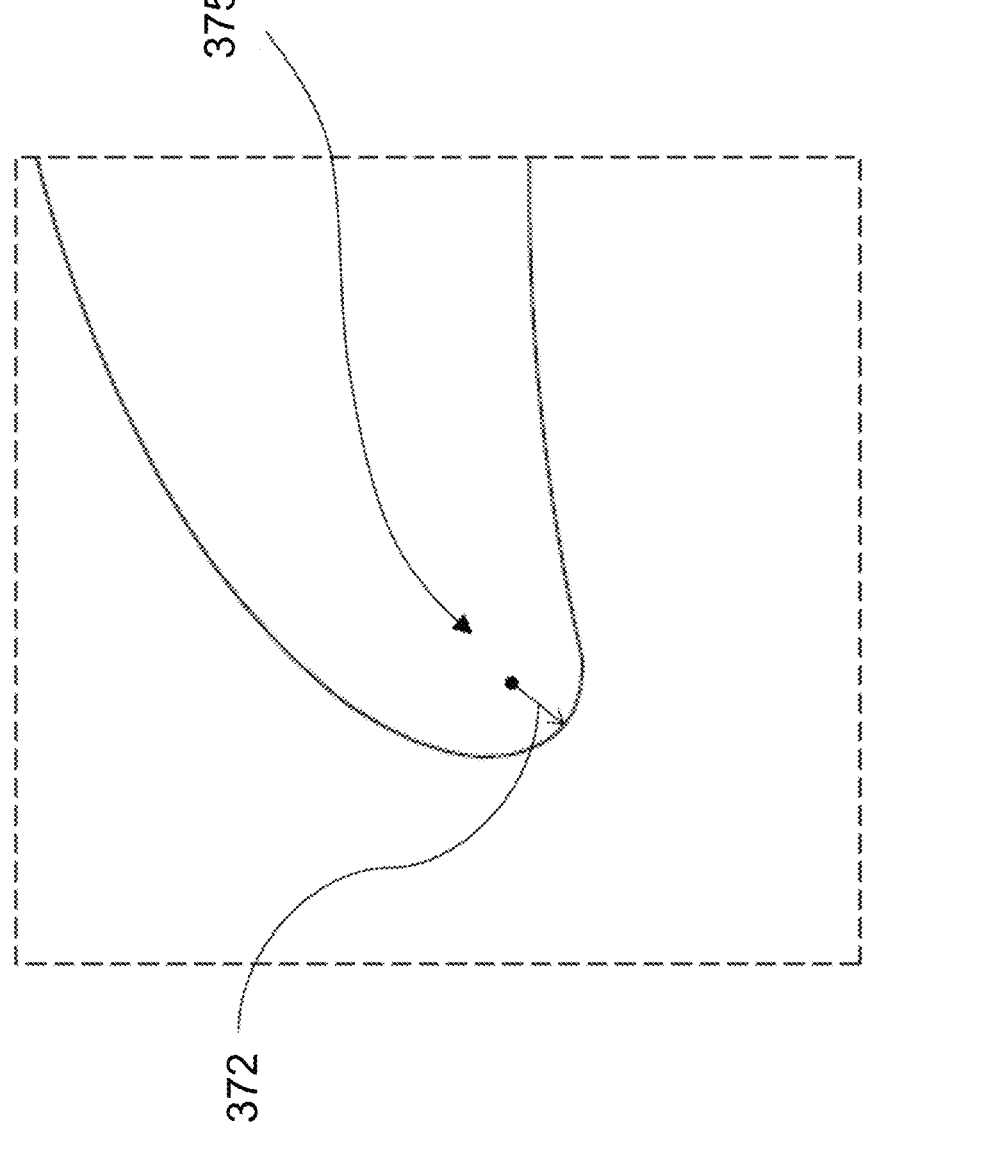
FIG. 20 illustrates an example portion of a disc-shaped spring under stress according to some implementations.
Figure 21:
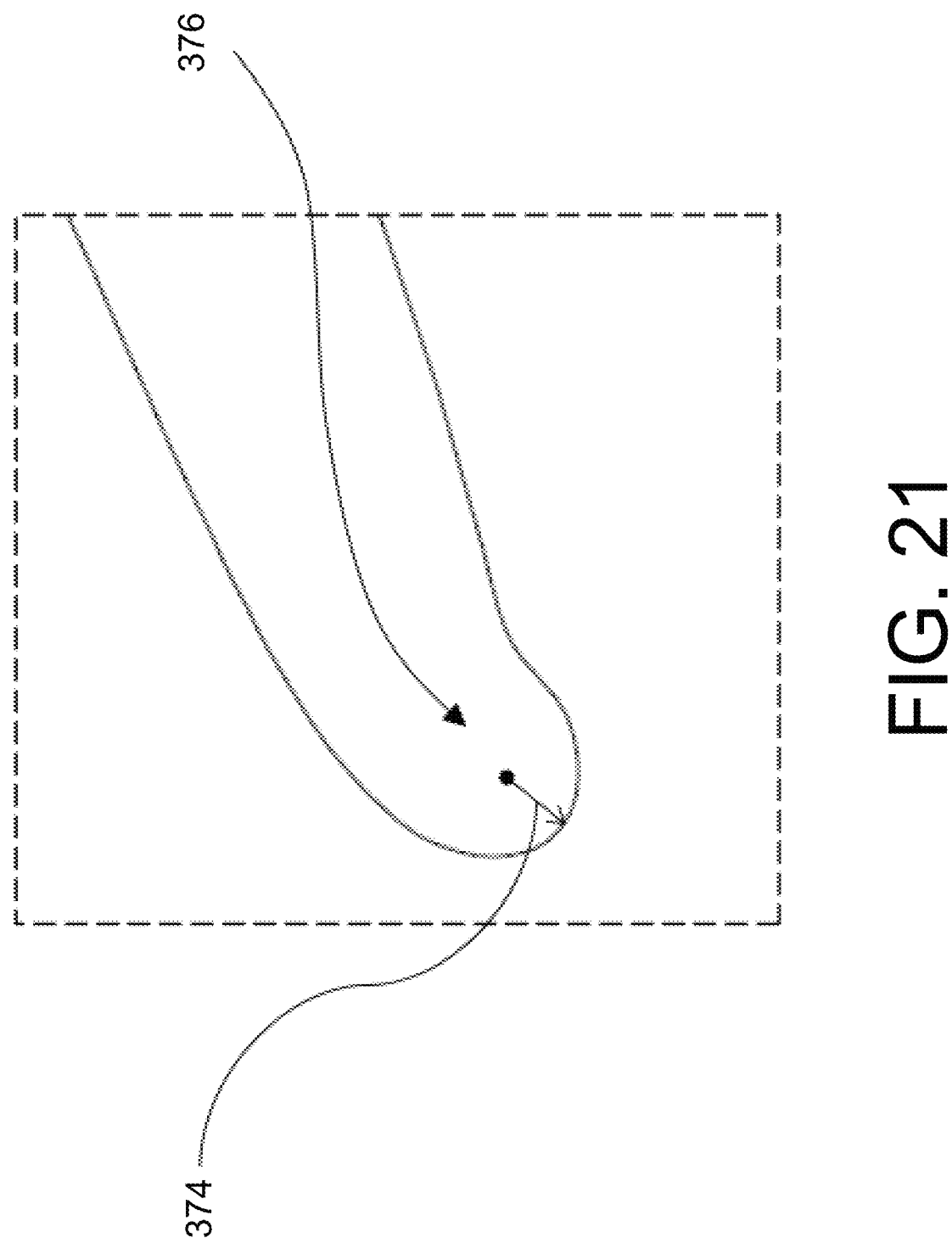
FIG. 21 illustrates an example portion of a disc-shaped spring under stress according to some implementations.

FIGS. 20 and 21 illustrates an example portion of a disc-shaped spring 360 under stress according to some implementations. For example, the minimum radius 372 of the sharp corner 375 in FIG. 12 may not be less than 0.6 mm and the minimum radius 374 in FIG. 21 of the sharp corner 376 in FIG. 13 may not be less than 0.57 mm. As a result, the spirals 362 may deform only elastically within an intended maximum allowable torque. For example, when 30 Nm of torque is applied, stress (in von Mises) along the spirals of spring 360 in FIG. 12 and spring 360A in FIG. 20 do not exceed approximately 460 MPa and approximately 410 MPa, respectively. In this specific example, there are four deformable spirals. A different number of spirals may be adopted but may change the shape of the spiral for given stiffness and maximum allowable torque.

Still referring to FIG. 12, when a maximum allowable torque is applied between the inner 364 and outer 366 mount segment, multiple points at the spiral bodies may interfere each other and serve as a hard stop. When an excessive torque rotates the inner mount segment 364 counter clockwise with respect to the outer mount segment 366, at the four outer narrow channels 381, the middle thin section 365 of one spiral 362 bulges out and may interfere with the outer thick section 367 of the other spiral 362. The width of the outer narrow channels is around 0.7 mm for spring 360 in FIG. 12 and around 0.8 mm for spring 360A in FIG. 13. Similarly, when an excessive toque is applied in the inverse direction, at the four inner narrow channels 383, the middle thin section 365 of one spiral 362 shrinks inward and may interfere with the inner thick section 363 of the other spiral 362 preventing an excessive deformation of the spirals. The width of the inner narrow channels is around 0.8 mm for spring 360 and around 0.9 mm for spring 360A. These interferences cause a nonlinear increase of stiffness of the spring 360 and serve as a hard stop to prevent excessive deformation of the spring if more than intended maximum allowable torque is applied. In some examples, the outer narrow channels may be between 0.5 mm and 0.9 mm and the inner narrow channels may be between 0.6 mm and 1.1 mm for either spring 360 or 306A.

Figure 22:
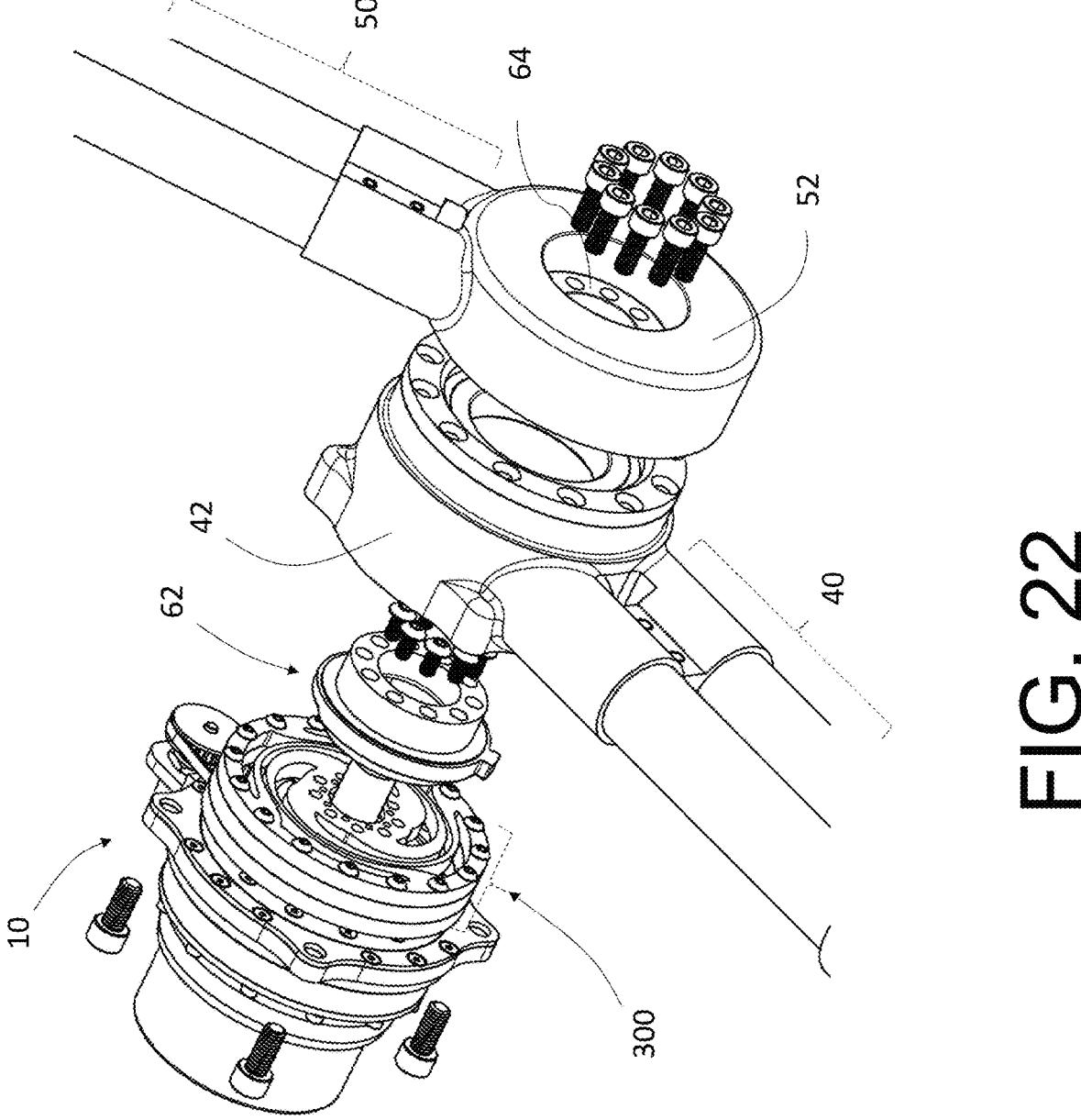
FIG. 22 illustrates another example exploded view of a robotic joint assembly with the SEA 10 according to some implementations.

FIG. 22 illustrates another example exploded view of a robotic joint assembly with the SEA 10 according to some implementations. The SEA housing frame of the SEA 10 may be attached to the joint housing body 42 of the link 40 while the output mount of the spring assembly 300 of the SEA 10 is coupled with the upper mount section 64 of the joint housing body 52 of the output link 50 via the joint bearing 62. At the joint, an outer race of a joint bearing (e.g. cross roller bearing) may be fixed at the joint housing body 42 of the input link. One side of a bore shaft that sits on the inner race of the joint bearing may be coupled with the joint housing body 52 of the output link 50 while the other side of the bore shaft may be coupled with the output mount of the spring assembly 300 of the SEA 10. The SEA 10 generates motive torque that transfers to the output link 50. The output link may be relatively rotate with respect to the link 40 around the axis 30 and may exert force to the environment.

Figure 23:
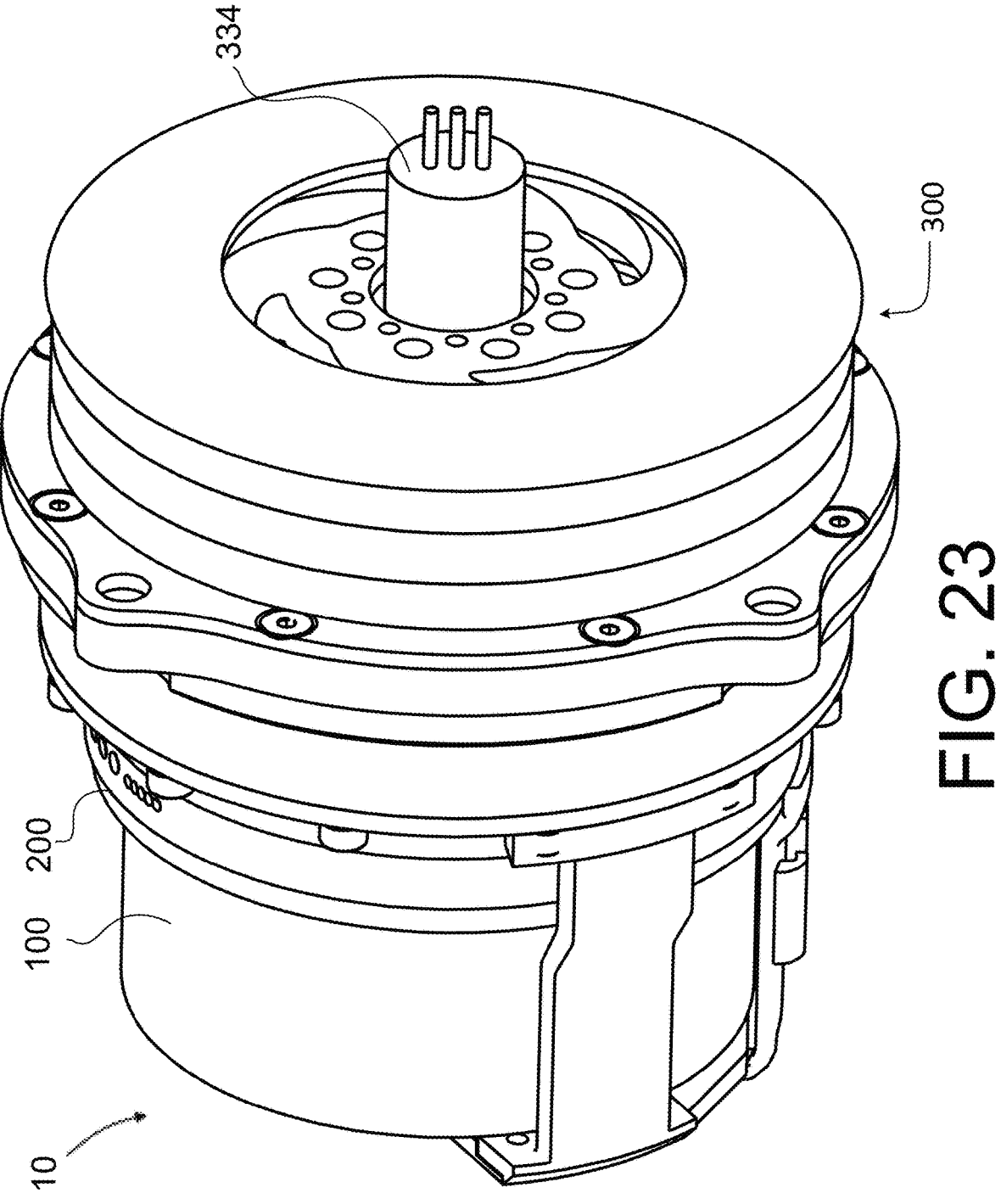
FIG. 23 illustrates an example view of an SEA with a protective cover on a spring assembly according to some implementations.

FIG. 23 illustrates an example view of an SEA 10 with a protective cover on a spring assembly according to some implementations. In the current example, the rotary SEA 10 includes a motor 100, gear transmission assembly 200, and spring assembly 300 with a sensor (e.g. an absolute encoder) 334. Additional components and detailed features of the SEA 10 are further discussed in the following paragraphs in associated with additional figures.

While FIGS. 1-23 show various views, examples, and implementations, it should be understood that the features of FIGS. 1-23 may be applicable to any of the implementations illustrated. Further, terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X mm" is recited, a lower or higher height is still "approximately X mm" if the desired function can still be performed or the desired result can still be achieved.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A spring assembly for a rotary series elastic actuator comprising:

a first torsional spring including a first set of elastically deformable spirals, a first circular inner mount, and a first circular outer mount;

a second torsional spring including a second set of elastically deformable spirals a second circular inner mount, and a second circular outer mount, the first circular outer mount coupled to the second circular out mount via a spacer;

an internal mechanism residing between the first torsional spring and the second torsional spring, the internal mechanism including a sensor to detect a rotational deflection of the spring assembly and provide the rotational deflection as a measured torque input value to a motor controller; and wherein and each of the first set of elastically deformable spirals includes an inner thick segment coupled to the first circular inner mount, an outer thick segment coupled to the first circular outer mount, and a middle thin section connected between the inner thick segment and the outer thick segment.

2. The spring assembly as recited in claim 1, wherein the first torsional spring is aligned concentrically with the second torsional spring.

3. The spring assembly as recited in claim 1, wherein the internal mechanism includes:

a base arm including a first end and a second end;

a swing arm including a first arm and a second arm, the first arm and the second arm shaped as circular arcs;

a first pulley coupled to the first end of the base arm and configured to rotate freely with respect to the base arm;

a second pully coupled to the second end of the base arm and configured to rotate freely with respect the base arm, the second end opposite the first end; and a string coupled the first arm of the swing arm and the second arm of the swing arm and tensions around to the first pulley, a sensor shaft of the sensor, and the second pully.

4. The spring assembly as recited in claim 3, wherein:

the swing arm is grounded to the first circular inner mount;

the base arm is grounded to the second circular inner mount;

a rotary sensor having a stationary part grounded to the second circular inner mount such that a sensor shaft is placed between the first torsional spring and the second torsional spring and concentrically aligned with the first circular inner mount and the second circular inner mount; and the swing arm and base arm are facing each other and configured to relatively rotate with respect to each other and together with the first circular inner mount and the second circular inner mount in response to a torque applied between the first circular inner mount and the second circular inner mount.

5. The spring assembly as recited in claim 3, wherein the string is tensioned first around the first pulley then around the sensor shaft of the sensor, and then around the second pully.

6. The spring assembly as recited in claim 1, wherein a relative thickness of the inner thick segment to the middle thin section is at a ratio between 11:1 and 8:1 and a relative thickness of the middle thin section to the outer thick segment is at a ratio between 1:10 and 1:7.

7. The spring assembly as recited in claim 1, wherein the first set of elastically deformable spirals includes at least two individual spirals.

8. The spring assembly as recited in claim 1, wherein the sensor is an absolute encoder.

9. The spring assembly as recited in claim 1, wherein the spring assembly has a stiffness in a range of approximately 200 Nm/rad to approximately 900 Nm/rad.

10. A spring assembly comprising:

two or more torsional springs, individual torsional springs including a set of elastically deformable spirals, a circular inner mount, and a circular outer mount, individual deformable spirals of the set of elastically deformable spirals including an inner thick segment coupled to the first circular inner mount, an outer thick segment coupled to the first circular outer mount, and a middle thin section connected between the inner thick segment and the outer thick segment;

an internal mechanism residing between the two or more torsional springs;

a sensor coupled to the internal mechanism to detect a rotational deflection of the spring assembly; and wherein the spring assembly is positioned between a motor and an output of an actuator and the output is rigidly coupled to a next link.

11. The spring assembly as recited in claim 10, wherein the sensor coupled to the internal mechanism provides the rotational deflection as a measured torque input value to a motor controller.

12. The spring assembly as recited in claim 10, wherein the internal mechanism includes:

a base arm including a first end and a second end;

a swing arm including a first arm and a second arm, the first arm and the second arm shaped as circular arcs;

a first pulley coupled to the first end of the base arm and configured to rotate freely with respect to the base arm;

a second pully coupled to the second end of the base arm and configured to rotate freely with respect the base arm, the second end opposite the first end; and a string coupled the first arm of the swing arm and the second arm of the swing arm and tensions around to the first pulley, a sensor shaft of the sensor, and the second pully.

13. The spring assembly as recited in claim 10, wherein individual ones of the two or more torsional springs includes an inner thick segment, an outer thick segment, and a middle thin section connected between the inner thick segment and the outer thick segment.

14. The spring assembly as recited in claim 10, wherein the spring assembly is incorporated into a rotary series elastic actuator.

15. A spring assembly for a rotary series elastic actuator comprising:

a first torsional spring including a first set of elastically deformable spirals, a first circular inner mount, and a first circular outer mount and wherein individual ones of the first set of elastically deformable spirals includes a first inner thick segment coupled to the first circular inner mount, a first outer thick segment coupled to the first circular outer mount, and a first middle thin section connected between the first inner thick segment and the first outer thick segment;

a second torsional spring aligned concentrically with the first torsional spring, the second torsional spring including a second set of elastically deformable spirals a second circular inner mount, and a second circular outer mount, the first circular outer mount coupled to the second circular out mount via a spacer and wherein individual ones of the second set of elastically deformable spirals includes a second inner thick segment coupled to the second circular inner mount, a second outer thick segment coupled to the second circular outer mount, and a second middle thin section connected between the second inner thick segment and the second outer thick segment;

an internal mechanism residing between the first torsional spring and the second torsional spring; and a sensor coupled to the internal mechanism, the sensor to detect a rotational deflection of the spring assembly and provide the rotational deflection as a measured torque input value to a motor controller.

16. The spring assembly as recited in claim 15, wherein the spring assembly has a stiffness in a range of approximately 200 Nm/rad to approximately 900 Nm/rad.

17. The spring assembly as recited in claim 15, wherein the internal mechanism includes:

a base arm grounded to the second circular inner mount and including a first end and a second end;

a swing arm grounded to the first circular inner mount and including a first arm and a second arm, the first arm and the second arm shaped as circular arcs;

a first pulley coupled to the first end of the base arm and configured to rotate freely with respect to the base arm;

a second pully coupled to the second end of the base arm and configured to rotate freely with respect the base arm, the second end opposite the first end; and a string tensioned around the first pulley, a sensor shaft of the sensor, and the second pully and coupled to the first arm of the swing arm and the second arm of the swing arm.

18. The spring assembly as recited in claim 17, wherein:

a rotary sensor having a stationary part grounded to the second circular inner mount such that a sensor shaft is placed between the first torsional spring and the second torsional spring and concentrically aligned with the first circular inner mount and the second circular inner mount; and the swing arm and base arm are facing each other and configured to relatively rotate with respect to each other and together with the first circular inner mount and the second circular inner mount in response to a torque applied between the first circular inner mount and the second circular inner mount.

19. The spring assembly as recited in claim 15, wherein the spring assembly is positioned between a motor and an output of an actuator and the output is rigidly coupled to a next link.

20. The spring assembly as recited in claim 1, wherein the spring assembly is positioned between a motor and an output of an actuator and the output is rigidly coupled to a next link.

\* \* \* \* \*